(12) United States Patent
Babu

(10) Patent No.: US 9,979,591 B2
(45) Date of Patent: *May 22, 2018

(54) EVENT NOTIFICATIONS FOR APPLICATIONS

(71) Applicant: Samsung Electronics Co., Ltd., Suwon-si, Gyeonggi-do (KR)

(72) Inventor: Narayan Babu, Kerala (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/838,489

(22) Filed: Aug. 28, 2015

(65) Prior Publication Data

US 2017/0063606 A1    Mar. 2, 2017

(51) Int. Cl.
*G06F 15/173* (2006.01)
*H04L 12/24* (2006.01)
(Continued)

(52) U.S. Cl.
CPC .......... *H04L 41/0686* (2013.01); *G06F 9/542* (2013.01); *H04L 67/12* (2013.01);
(Continued)

(58) Field of Classification Search
CPC ...... G06F 1/163; G06F 1/3206; G06F 21/552; G06F 19/3418; A61B 5/0022;
(Continued)

(56) References Cited

U.S. PATENT DOCUMENTS 8,799,406 B1    8/2014 Slonh
2013/0192071 A1    8/2013 Esposito et al.
(Continued)

FOREIGN PATENT DOCUMENTS

KR    2009-0048803 A    5/2009
KR    2014-0072771 A    6/2014
(Continued)

OTHER PUBLICATIONS

Cohen, Norman H. et al., "Building Context-Aware Applications with Context Weaver," IBM Research Report, IBM Research Division, Oct. 22, 2004.
(Continued)

*Primary Examiner* — Hitesh Patel
(74) *Attorney, Agent, or Firm* — Jefferson IP Law, LLP

(57) ABSTRACT

A server includes a network communication device, memory hardware, and data processing hardware. The data processing hardware receives sensor data and application data from a client computing device. The sensor data includes sensor measurement values from sensors. The application data indicates application states applications. The data processing hardware receives a request to provide event notifications to a first application from the plurality of applications upon an occurrence of an event. The request includes an event description. The data processing hardware identifies an event trigger that indicates the occurrence of the event. The event trigger includes an application state of a second application and a sensor measurement value for at least one of the sensors. The data processing hardware detects the occurrence of the event by comparing the event trigger with the sensor data and the application data, and transmits an event notification to the first application upon detecting the event.

19 Claims, 12 Drawing Sheets

(51) Int. Cl.
*G06F 9/54* (2006.01)
*H04L 29/08* (2006.01)
*H04W 4/00* (2018.01)
*G06N 99/00* (2010.01)

(52) U.S. Cl.
CPC ............... *H04L 67/26* (2013.01); *H04W 4/00* (2013.01); *G06N 99/005* (2013.01); *H04L 41/16* (2013.01); *H04L 41/22* (2013.01)

(58) Field of Classification Search
CPC ..... A61B 5/681; A61B 5/024; A61B 5/02438; A61B 5/0404; A61B 5/7435; A61B 5/7475; A61B 5/6802; A61B 8/565; H04N 21/41407; H04N 21/472; H04N 21/44218; H04W 52/0209; H04W 52/0254
See application file for complete search history.

(56) References Cited

U.S. PATENT DOCUMENTS

| | | | | |
|---|---|---|---|---|
| 2014/0140675 | A1* | 5/2014 | de Sa | H04N 21/21805 386/223 |
| 2015/0207915 | A1 | 7/2015 | Roberts et al. | |
| 2015/0207916 | A1 | 7/2015 | Xue et al. | |
| 2016/0037001 | A1* | 2/2016 | Mummaw | H04N 1/00244 348/207.1 |
| 2016/0140828 | A1* | 5/2016 | DeForest | G06F 19/3418 340/539.12 |
| 2017/0060648 | A1 | 3/2017 | Babu | |

FOREIGN PATENT DOCUMENTS

| | | |
|---|---|---|
| KR | 2014-0074824 A | 6/2014 |
| KR | 2015-0096130 A | 8/2015 |

OTHER PUBLICATIONS

Carlson, Darren et al., "Dynamix: An Open Plug-and-Play Context Framework for Android," Ambient Computing Group/Institute of Telematics, University of Lubeck, Germany, 2012.

Kramer, Dean et al., "An extensible, self contained, layered approach to context acquisition," M-MPAC '2011, Lisbon, Portugal, Dec. 12, 2011.

David, Pierre-Charles et al., "WildCAT: a generic framework for context-aware applications," MPAC '05, Grenoble, France, Dec. 2, 2005.

Wissen, Bart van et al., "ContextDroid: an Expression-Based Context Framework for Android," Vrije Universiteit, Amsterdam, The Netherlands, 2010.

PCT International Search Report and Written Opinion for PCT Application No. PCT/IB2016/055128, dated Dec. 9, 2016, 9 pages.

* cited by examiner

EVENT NOTIFICATIONS FOR APPLICATIONS

TECHNICAL FIELD

This disclosure relates to transmitting event notifications to applications that may be installed on mobile computing devices.

BACKGROUND

Many mobile computing devices include computing processors that can download and execute applications. Some mobile computing devices include sensors that can take sensor measurements. Example sensors include a location sensor, an accelerometer, a gyroscope, a magnetometer, or the like. Some applications may monitor sensor measurements to determine context. For example, an application may monitor the location sensor to determine a location of the mobile computing device. An application may monitor the accelerometer to determine a number of steps that a user of the device may have traversed during a day. Some application developers spend vast amounts of time writing code, so that their applications can determine context.

SUMMARY

A server may transmit an event notification to an application upon detecting an occurrence of an event. The server may include a network communication device, memory hardware (e.g., a storage device), and data processing hardware a processing device). The data processing hardware may execute computer-readable instructions that, when executed by the data processing hardware, cause the data processing hardware to receive sensor data and application data from a client computing device via the network communication device. The sensor data may include sensor measurement values from sensors in the client computing device. The application data may indicate application states of applications installed on the client computing device. The data processing hardware may receive a request to provide event notifications to an application installed on the client computing device upon detecting an occurrence of an event. The request may include an event description that describes the event.

The data processing hardware may identify an event trigger that indicates the occurrence of the event. The event trigger may include an application state trigger that indicates an application state of another application. The event trigger may include a sensor measurement trigger that indicates a sensor measurement value for one of the sensors. The data processing hardware may detect the occurrence of the event by comparing the application state trigger with application states in the application data. The data processing hardware may detect the occurrence of the event hy comparing the sensor measurement trigger with sensor measurement values in the sensor data. The data processing hardware may transmit an event notification to the application upon detecting the occurrence of the event. The event notification may indicate that the event has occurred.

A computing device may use sensor measurements and application states to detect an occurrence of an event. The computing device may include a touchscreen display, sensors, a transceiver, a memory that stores applications, and data processing hardware (e.g., a computing processor). The data processing hardware executes computer-readable instructions that, when executed by the data processing hardware, cause the data processing hardware to perform one or more of the following. The data processing hardware may receive a selection to install another application. The data processing hardware determines that the selected application is requesting an event notification to notify the application that an event has occurred.

The data processing hardware identifies sensors that are used to detect the occurrence of the event. For each sensor that is used to detect the occurrence of the event, the data processing hardware requests permission to use sensor measurement values of the sensor to detect the occurrence of the event. The data processing hardware uses the sensor measurement values to detect the occurrence of the event in response to the request being granted. The data processing hardware identifies applications that are used to detect the occurrence of the event. For each application that is used to detect the occurrence of the event, the data processing hardware requests permission to use application states of the application in detecting the occurrence of the event. The data processing hardware uses the application states to detect the occurrence of the event in response to the request being granted.

A computer-implemented method may include one or more of the following. Data processing hardware of a computing device may receive a selection to install an application on the computing device. The data processing hardware may dete mine that the selected application is requesting an event notification to notify the application regarding an occurrence of a corresponding event. A transceiver in the data processing hardware transmit an application identifier (ID) of the selected application to a server. In response to transmitting the application ID, the data processing hardware receives sensor identifiers that identify sensors of the computing device that may be used to detect the occurrence of the event.

For each sensor that may be used to detect the occurrence of the event, the data processing hardware requests permission, via a touchscreen display of the computing device, to use sensor measurement values of the sensor in detecting the occurrence of the event. The data processing hardware notifies the server, via the transceiver, to use the sensor measurement values to detect the occurrence of the event in response to the request being granted. In response to transmitting the application ID, the data processing hardware receives application identifiers that identify applications installed on the computing device that may be used to detect the occurrence of the event. For each application that may be used to detect the occurrence of the event, the data processing hardware requests permission, via the touchscreen display, to use application states of the application in detecting the occurrence of the event. The data processing hardware notifies the server, via the transceiver, to use the application states to detect the occurrence of the event in response to the request being granted.

BRIEF DESCRIPTION OF DRAWINGS

Like reference symbols in the various drawings may indicate like elements.

DETAILED DESCRIPTION

Figure 1:
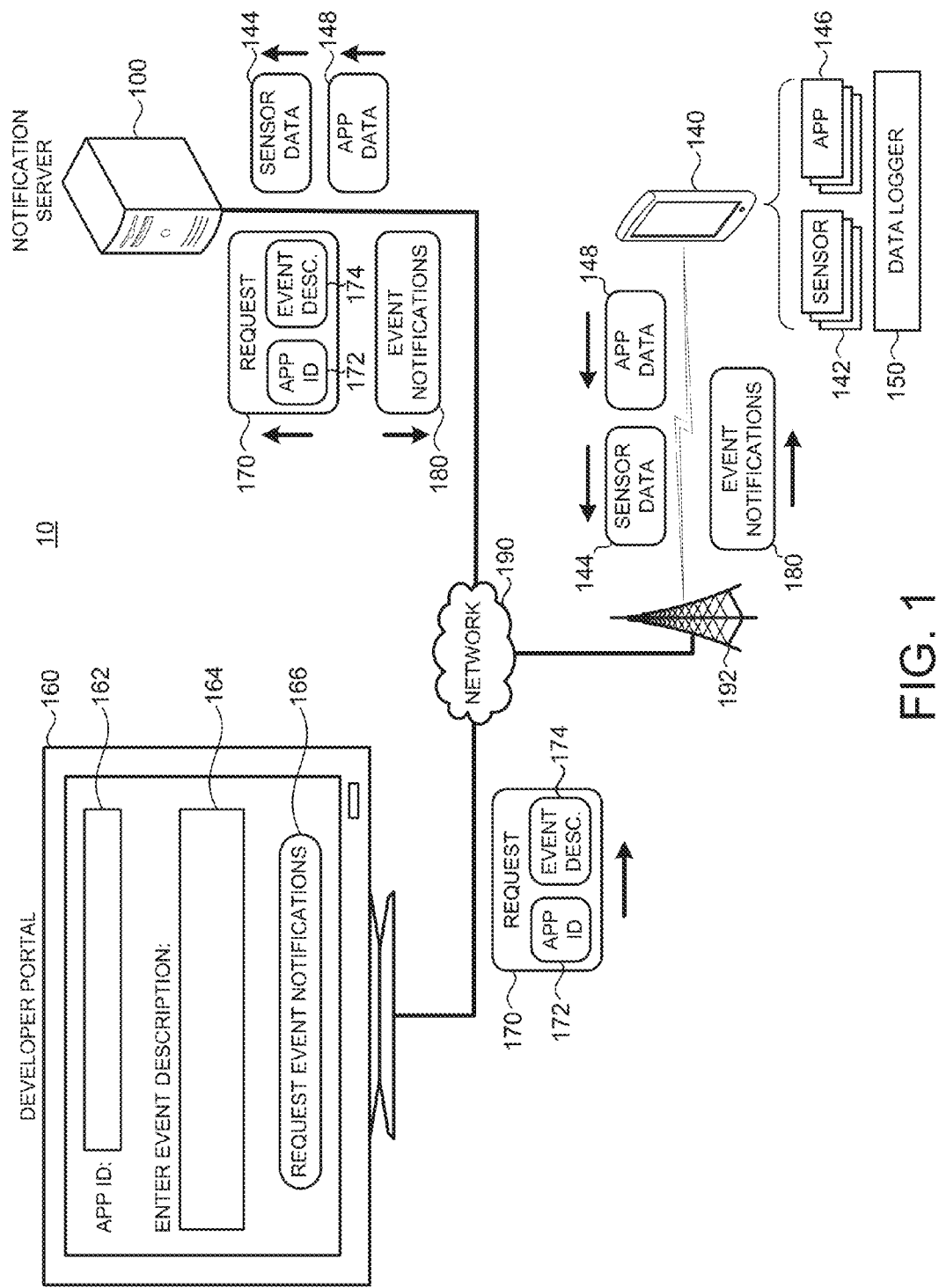
FIG. 1 is a schematic diagram that illustrates an example system for generating event notifications for applications installed on client computing devices.

Mobile computing devices can include many applications. Some applications may determine a context of the mobile computing device. To determine the context of the mobile computing device, an application may monitor sensors or other applications installed on the mobile computing device. For example, to determine that a user of the mobile computing device is exercising, a fitness application may monitor a heart rate sensor. The fitness application may determine that the user is exercising when the heart rate sensor measures a heart rate that is above a threshold (e.g., 150 beats per minute (bpm)). An application developer may have to write software program code that enables the application to determine the context. Writing the software program code may be a time-consuming endeavor for the application developer. Furthermore, since most applications may not share the determined context with each other, application developers often waste time writing software program code for known contexts.

An application may cause the mobile computing device to run (e.g., execute) a dedicated service to determine the context. For example, the fitness application may cause the mobile computing device to execute a service in order to monitor the heart rate sensor. The mobile computing device may have to execute multiple services when multiple applications are monitoring a sensor. For example, the mobile computing device may have to execute a service for the fitness application to monitor the heart rate sensor, and another service for a wellness application to monitor the heart rate sensor. When the mobile computing device executes a service, the service uses processing resources of the mobile computing device. Executing multiple services to determine the same context for different applications may result in resource wastage.

The mobile computing device (client computing device, hereinafter) can send sensor data, and application data to a server. The sensor data may include a list of sensors in the client computing device, and a sensor measurement value for each sensor. For example, the sensor data may identify a heart rate sensor and a heart rate in beats per minutes. The application data may include a list of applications, and an application state of each application. For example, the application data may identify a music player application, and indicate that the music player application is playing a workout playlist. The client computing device sends sensor data for sensors and application data for applications that a user has approved to detect context. The client computing device refrains from sending sensor data for sensors and application data for applications that the user has rejected for use in detecting context.

The server can determine the context of the client computing device instead of each application having to determine the context. For example, the server can determine when the user is exercising instead of the fitness application having to determine when the user is exercising. An application developer can provide the server with an event description that describes an event that the application developer wants the application to be notified about. For example, the application developer of the fitness application may want the fitness application to be notified when the user is exercising. Accordingly, the application developer may provide the server with an event description that reads "detect when the user is exercising".

The server identifies event triggers that indicate an occurrence of the event. The event triggers may include a list of sensors or a list of applications that the server may monitor to detect the occurrence of the event. For example, the server may monitor the heart rate sensor and the music player application to determine whether the user may be exercising. The server may determine that the user is exercising upon detecting a heart rate greater than 150 bpm, or upon detecting that the music player application is playing a workout playlist.

An operator (e.g., human operator) may define the event triggers. The operator may associate keywords with each event trigger. The event triggers and their associated keywords may be stored in an inverted index or a look-up table. The server may identify event triggers by comparing terms in the event description with the keywords. The server may use parsers to parse the event description into tokens, and compare the tokens with the keywords. The server may use a machine learner to identify the event triggers. The machine learner may be a semi-supervised machine learner that uses operator-defined event descriptions and their associated event triggers as training data to build a model.

Upon detecting the occurrence of the event, the server sends an event notification to the application. The event notification notifies the application that the server detected an occurrence of the event. For example, the server may send an event notification to the fitness application upon detecting a heart rate greater than 150 bpm, or upon detecting that the music player application is playing a workout playlist. The event notification may specify the event trigger that the server used to detect the occurrence of the event. For example, the event notification to the fitness application may include the heart rate (e.g., heart-rate:164 bpm), and an indication that the music player is playing the workout playlist (e.g., playing-workout-playlist:1). The server may send the event notification to the application using JavaScript Object Notation (BON).

Because the server is detecting context, the client computing device may not have to execute multiple services when multiple applications are detecting the same context. By not executing multiple services, the client computing device may conserve processing resources. Application developers may not have to write as much software program code for their applications to detect context because the server is detecting the context. By not having to writing software program code to detect known contexts, the application developers can reduce development time and potential software bugs.

FIG. 1 illustrates a system 10 for generating event notifications. An event notification may indicate an occurrence of an event. The system 10 includes a server 100, a client computing device 140, and a developer portal 160. The server 100 may receive sensor data 144 and application data 148 from the client computing device 140. The server 100 may receive a request 170 from the developer portal 160 to send event notifications 180 to an application 146 on the client computing device. The request 170 may include an application identifier (ID) that identifies the application 146. The request 170 may include an event description 174 that describes an event. The server 100 may detect the event based on the sensor data 144 and the application data 148. The server 100 may send the event notification 180 to the application 146 upon detecting the event.

The client computing device 140 may include sensors 142. The sensors 142 may generate sensor measurement values. The client computing device 140 may send the sensor measurement values to the server 100 (e.g., as sensor data 144). The sensors 142 may measure characteristics of a human body. For example, the sensors 142 may include a heart rate sensor, a blood pressure sensor, a blood glucose sensor, a temperature sensor, or the like. The sensors 142 may measure environmental characteristics. For example, the sensors 142 may include an ambient light sensor, a humidity sensor, a pressure sensor, an ambient temperature sensor, or the like.

The sensors 142 may measure characteristics of the client computing device 140. For example, the sensors 142 may include a location sensor, an accelerometer, a gyroscope, a magnetometer, or the like. The sensors 142 may detect objects. For example, the sensors 142 may include a proximity sensor, a Hall effect sensor, or the like. The sensors 142 may be integrated into a chip. The client computing device 140 may include a computing processor that may include on-die sensors. For example, the computing processor may be a system-on-chip that includes an on-die location sensor. The sensor data 144 may include a list of the sensors 142 and corresponding sensor measurement values for the sensors 142. The client computing device 140 may send the sensor data 144 to the server 100 periodically (e.g., once an hour, or once a minute). The client computing device 140 may send the sensor data 144 to the server 100 upon receiving a request for the sensor data 144 from the server 100. An application 146 may cause the client computing device 140 to send the sensor data 144 to the server 100. For example, an application 146 may prompt the client computing device 140 to send the sensor data 144 when the application 146 is determining whether an event has occurred. A user of the client computing device 140 may command the client computing device 140 to send the sensor data 144 to the server 100. The client computing device 140 may send the sensor data 144 in a container (e.g., in a JSON file).

The client computing device 140 may include applications 146. The applications 146 may be stored in a memory of the client computing device 140. A computing processor may execute an application 146 by executing computer-readable instructions (e.g., object code) corresponding with the application 146. An application 146 may receive the event notification 180. The event notification 180 may notify the application 146 that a corresponding event has occurred. The event notification 180 may be directed to a particular application, for example, instead of being directed to all applications. An application 146 may perform an application function based on the event notification. For example, a red-eye removal application may automatically operate on a captured image upon receiving an event notification that the image has been captured.

The applications 146 may be referred to as native applications. The applications 146 may include pre-installed applications. A pre-installed application may be installed on the client computing device 140 by a manufacturer of the client computing device 140, a developer of an operating system, or a cellular service provider. The client computing device 140 may download the applications 146 from a digital distribution platform (e.g., an application store). Examples of the applications 146 include an email application, a messaging application, a web browser application, a social networking application, a phone application, an image application, a gaming application, or the like.

The applications 146 may generate the application data 148. The application data 148 may indicate application usage. The application data 148 may indicate a time duration during which a particular application was used. The application data 148 may indicate an application function that was used, or is currently being used. The application data 148 may indicate an application state that was viewed on the client computing device 140, or is currently being viewed. The application data 148 may indicate an application usage frequency. For example, the application data 148 may indicate that a music player application is used every morning from 7 am to 7:30 am to play a workout playlist. The application data 148 may indicate that a maps application is used from 8 AM to 8:30 AM to display traffic information along a route from a user's home to a user's work place.

The application data 148 may indicate an activity that a user of the client computing device 140 is performing. For example, the application data 148 may indicate that a messaging application is being used to communicate with a contact stored in a contacts application. The client computing device 140 may send the application data 148 to the server 100. The client computing device 140 may send the application data 148 periodically (e.g., once an hour, once a minute, or the like). The client computing device 140 may send the application data 148 in response to receiving a request for the application data 148 from the server 100. The client computing device 140 may send the application data 148 with the sensor data 144. The application data 148 may include a client device identifier (ID) that identifies the client computing device 140. The client device ID may include a phone number, an email address, a Personal Identification Number (PIN), or the like.

The client computing device 140 may include a data logger 150. The data logger 150 may log (e.g., store) the sensor data 144 and application data 148. The data logger 150 may transmit the logged sensor data 144 and application data 148 to the server 100. The data logger 150 may log the sensor data 144 and the application data 148 at multiple times. The data logger 150 may transmit a batch of logs, for example, instead of individual logs. The data logger 150 may conserve battery power by transmitting the batch of logs, for example, because the data logger 150 may not wake up a transceiver of the client computing device 140 for every log transmission.

The data logger 150 may include an application (e.g., a pre-installed application) installed on the client computing device 140. The data logger 150 may be implemented as a service that the client computing device 140 may subscribe to. The data logger 150 may use application programming interfaces (APIs) to access the application data 148 related to the applications 146. The data logger 150 may be implemented by an operating system installed on the client computing device 140. The data logger 150 may be implemented by hardware circuitry, for example, by an Application Specific Integrated Circuit (ASIC). The data logger 150 may be implemented by a sensor hub on a computing processor of the client computing device 140.

The server 100 receives the sensor data 144 and the application data 148 from client computing devices 140. The server 100 may store the sensor data 144 and the application data 148 in a storage device (e.g., non-transitory memory). The server 100 may analyze the sensor data 144 and the application data 148 to detect the event described by the event description 174. Upon detecting the event, the server 100 dispatches the event notification 180 to the application 146 corresponding with the application ID 172. For example, the server 100 may transmit the event notification 180 to the client computing device 140.

An application developer may use the developer portal 160 to generate (e.g., define) the request 170. The developer portal 160 may include an application ID field 162, an event description field 164, and a request button 166. The application developer may input an application ID 172 in the application ID field 162. The application ID may identify one of the applications 146 installed on the client computing device 140. The application developer may input an event description 174 in the event description field 164. The application developer may input the event description 174 in natural language. The application developer may input the event description 174 using human readable terms, for example, instead of computer code. The application developer may press the request button 166 after inputting the application ID 172 and the event description 174. The developer portal 160 may send the request 170 to the server 100.

The server 100 may analyze the event description 174 to identify triggers that satisfy the event. The server 100 may identify sensor measurement triggers and application state triggers. The server 100 may parse the event description 174 to identify the triggers. The server 100 may include parsers. The server 100 may include sensor parsers that parse the event description 174. A sensor parser may include a set of computer-readable instructions that, when executed by the server 100, identifies sensors that the server 100 may monitor to detect an occurrence of the event. The sensor parsers may identify sensors that the server 100 may monitor to detect an occurrence of the event. The sensor parsers may identify sensor measurement values that the server 100 may use to detect an occurrence of the event.

The server 100 may include application parsers that parse the event description 174. An application parser may include a set of computer-readable instructions that, when executed by the server 100, identifies applications that the server 100 may monitor to detect an occurrence of the event. The application parsers may identify applications that the server 100 may monitor to detect an occurrence of the event. The application parsers may identify applications states that the server 100 may use to detect an occurrence of the event. Upon detecting the event, the server 100 may send event notifications 180 to the application 146 corresponding with the application ID 172 identified via the developer portal 160.

The server 100, the client computing device 140, and the developer portal 160 may communicate via a network 190. The network 190 may include a local area network (LAN), a wide area network (WAN), the Internet, and/or the like. The network 190 may include a wired network. The network 190 may include a wireless network, for example, a cellular network. The network 190 may include a base station 192 (e.g., an Evolved Node B). The client computing device 140 may communicate with the server 100 via the base station 192. The client computing device 140 may send the sensor data 144 and the application data 148, and receive the event notifications 180 wirelessly, for example, via a Long Term Evolution (LTE) transceiver.

Figure 2A:
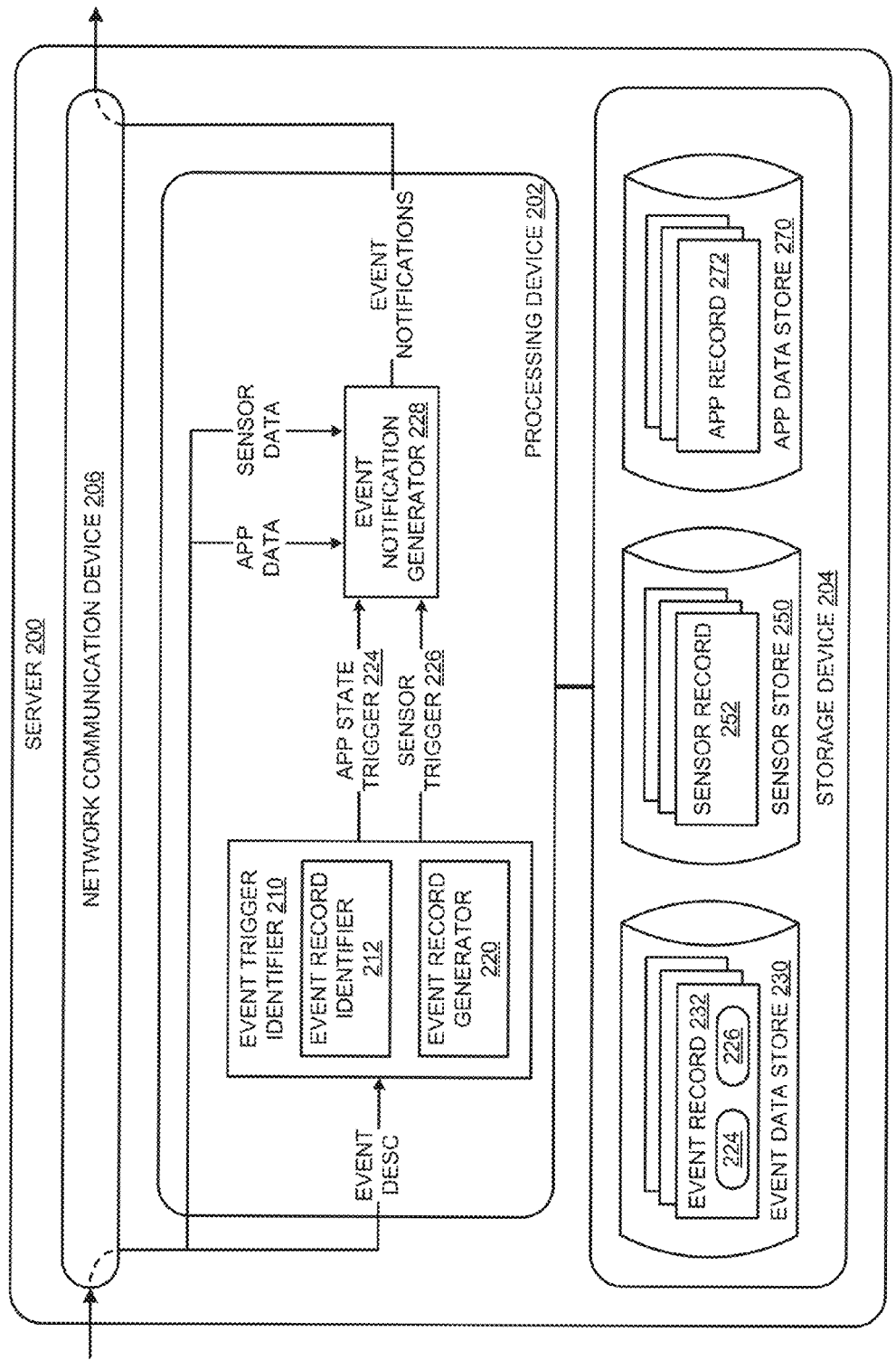
FIG. 2A is a block diagram of an example server that generates the event notifications for applications.

FIG. 2A is a block diagram of an example server 200. The server 200 illustrates an example implementation of the server 100. The server 200 receives sensor data (e.g., sensor data 144 shown in FIG. 1) and application data (e.g., application data 148 shown in FIG. 1) from client computing devices (e.g., client computing device 140 shown in FIG. 1). The server 200 receives an event description of an event (e.g., event description 174 shown in FIG. 1). The server 200 generates an event notification (e.g., event notification 180 shown in FIG. 1) upon detecting an occurrence of the event. The server 200 transmits the event notification in response to an occurrence of the event.

The server 200 may include a data processing hardware 202, a storage device 204 (e.g., memory hardware), and a network communication device 206. The data processing hardware 202 may include a collection of one or more computing processors that execute computer readable instructions. The computing processors of the data processing hardware 202 may operate independently, or in a distributed manner. The computing processors may be connected via a bus and/or a network. The computing processors may be located in the same physical device (e.g., same housing). The computing processors may be located in different physical devices (e.g., different housings, for example, in a distributed computing system). A computing processor may include physical central processing units (pCPUs). A pCPU may execute computer-readable instructions to implement virtual central processing units (vCPUs). The data processing hardware 202 may implement an event trigger identifier 210 and an event notification generator 228. The data processing hardware 202 may execute instructions, stored in the storage device 204 that cause the data processing hardware 202 to implement the event trigger identifier 210, and the event notification generator 228.

The storage device 204 stores data. The storage device 204 may include a computer readable storage medium. For example, the storage device 204 may include solid state memory devices, hard disk memory devices, optical disk drives, a read-only memory, nanotube-based storage devices, or the like. The storage device 204 may be connected to the data processing hardware 202 via a bus and/or a network. Different storage mediums within the storage device 204 may be located at the same physical location (e.g., in the same data center, same rack, or same housing). Different storage mediums of the storage device 204 may be distributed (e.g., in different data centers, different racks, or different housings). The storage device 204 may implement (e.g., store) an event data store 230, a sensor data store 250, and an application data store 270.

The network communication device 206 may communicate with a network (e.g., network 190). The network communication device 206 may include one or more communication interfaces that perform wired communication (e.g., via Ethernet, Universal Serial Bus (USB), or fiber-optic cables). The network communication device 206 may perform wireless communication (e.g., via cellular network, or satellites). The network communication device 206 may include a transceiver that communicates with the network in accordance with an Institute of Electrical and Electronics Engineers (IEEE) specification (e.g., Ethernet, Wireless Local Area Network (LAN), or the like). The network communication device 206 may include a transceiver that communicates with the network in accordance with a 3rd Generation Partnership Project (3GPP) specification (e.g., Code Division Multiple Access (CDMA), Long Term Evolution (LTE), LTE-Advanced, or the like). The network communication device 206 may include a transceiver that communicates with the network in accordance with a Universal Serial Bus (USB) specification (e.g., via a USB port).

The server 200 may be implemented by a cloud computing platform. The cloud computing platform may include a collection of remote computing services. The cloud computing platform may include computing resources (e.g., data processing hardware 202). The computing resources may include servers (e.g., physical servers, or virtual servers). The cloud computing resources may include storage resources (e.g., storage device 204). The storage resources may include database servers that may support NoSQL, MySQL, Oracle, SQL Server, or the like. The cloud computing platform may include networking resources (e.g., network communication device 206). For example, the networking resources may distribute incoming requests for event notifications across multiple virtual private servers. Example cloud computing platforms include Amazon Web Services, and Google Cloud Platform.

The event trigger identifier 210 may identify triggers that indicate an occurrence of an event. The event trigger identifier 210 may receive an event description for the event (e.g., event description 174). The event trigger identifier 210 may use the event description to identify the triggers. The event trigger identifier 210 may identify application state triggers 224 that indicate the occurrence of the event. An application state trigger 224 may indicate an application (e.g., application 146) and an application state. The event trigger identifier 210 may identify sensor triggers 226 that indicate the occurrence of the event. A sensor trigger 226 may indicate a sensor (e.g., sensor 142) and a sensor measurement value for the sensor.

The event trigger identifier 210 may include an event record identifier 212. The event record identifier 212 may identify an event record 232 from the event data store 230. The event record 232 may include the application state triggers 224 and the sensor triggers 226. The event records 232 may be generated by an operator (e.g., a human operator). Example event records 232 are discussed in related to FIG. 4A. The event record identifier 212 may identify the event record 232 based on the event description. The event record identifier 212 may search for an event record 232 in the event data store 230 based on terms included in the event description. Example implementations of the event record identifier 212 are discussed in relation to FIG. 2B.

The event trigger identifier 210 may include an event record generator 220. The event record generator 220 may generate event records 232. The event record generator 220 may store the event records 232 in the event data store 230. The event record generator 220 may generate an event record 232 for an event description, for example, if the event record identifier 212 is unable to identify an event record 232 based on the event description. The event record generator 220 may generate an event record 232, for example, when the event description does not match with existing event records 232 in the event data store 230.

The event record generator 220 may generate an event record based on the event description. The event record generator 220 may include parsers that parse the event description to identify application state triggers 224 and/or sensor triggers 226. The event record generator 220 may include a machine learner that identifies event triggers using a machine-learned model. The machine learner may generate the machine-learned model by using event records 232 as training data. Example implementations of the event record generator 220 are discussed in relation to FIGS. 2C-D.

The event notification generator 228 generates event notifications (e.g., event notifications 180). The event notification generator 228 may generate event notifications in response to detecting an occurrence of the event. The event notification generator 228 may receive sensor data (e.g., sensor data 144) and application data (e.g., application data 148). The event notification generator 228 may detect the occurrence of the event by comparing the sensor data with sensor triggers 226. The event notification generator 228 may detect the occurrence of the event by comparing the application data with application state triggers 224.

The event notification generator 228 may determine that a sensor trigger 226 is triggered by the sensor data, for example, if a sensor measurement value in the sensor data matches with a sensor measurement value in the sensor trigger 226. The event notification generator 228 may determine that an application state trigger 224 is triggered by the application data, for example, if an application state in the application state trigger 224 matches an application state in the application data. The event notification generator 228 may generate the event notifications in response to a match (e.g., an exact match, or an approximate match) between the triggers 224, 226 and the data. The event notification generator 228 may employ tolerance ranges. The event notification generator 228 may determine that a sensor measurement value in the sensor trigger 226 matches a sensor measurement value in the sensor data, for example, if the sensor measurement values are within a tolerance range (e.g., less than 5% apart).

The server 200 may store the sensor data and the application data in data stores. The server 200 may store the sensor data as sensor records 252 in a sensor data store 250. The server 200 may store the application data as application records 272 in an application data store 270. Example implementations of the sensor records 252 and the application records 272 are discussed in related to FIGS. 4B-C. The event notification generator 228 may retrieve the sensor data from the sensor records 252. The event notification generator 228 may retrieve the application data from the application records 277.

The event notification generator 228 may use multiple sensor records 252 to detect a sensor trigger 226. For example, a sensor trigger 226 may refer to a heart rate increasing by 50% in less than a minute. The event notification generator 228 may retrieve sensor records 252 from the last one minute, identify a heart rate measurement in each sensor record 252, and determine whether the heart rate measurements indicate a 50% increase. The event notification generator 228 may use multiple application records 272 to detect an application state trigger 224. For example, an application state trigger 224 may refer to a music player application being used for three consecutive days to listen to a workout play list. The event notification generator 228 may retrieve application records 272 for the last three days, and determine whether the music player application was used to play the workout play list on each day.

Figure 2B:
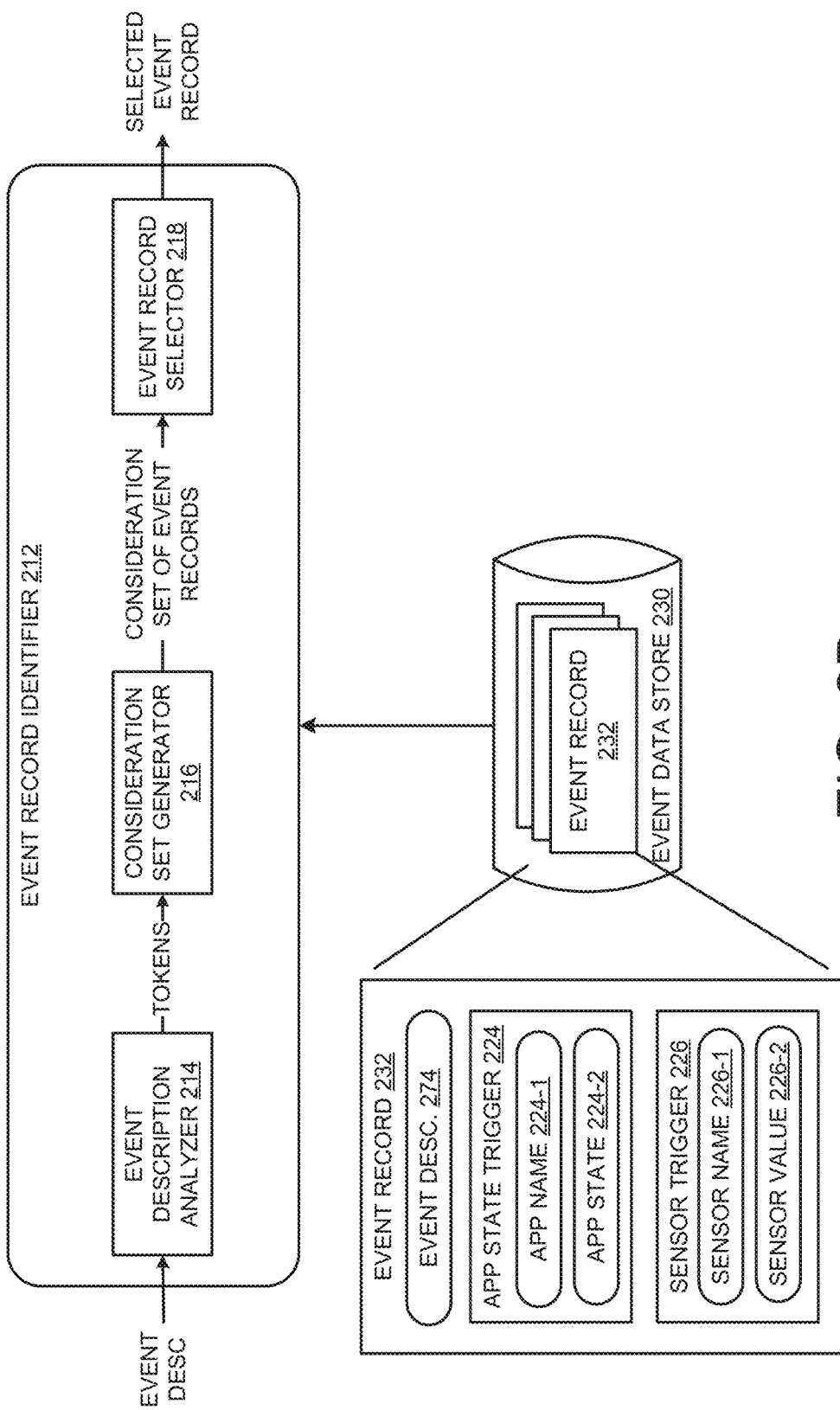
FIG. 2B is a block diagram of an example event record identifier of FIG. 2A.

FIG. 2B illustrates a block diagram of an example event record identifier 212. The event record identifier 212 receives an event description, and identifies an event record 232 from the event data store 230 based on the event description. The event record 232 may include triggers that indicate an occurrence of the event. For example, the event record 232 may include application state triggers 224, and sensor triggers 226. The event record identifier 212 may search the event data store 230 for an event record 232 based on terms included in the event description. The event description may be referred to as a search query. The event record identified by the event record identifier 212 may be referred to as a search result.

The event record identifier 212 may include an event description analyzer 214, a consideration set generator 216, and an event record selector 218. The event description analyzer 214 analyzes the event description. The event description analyzer 214 may tokenize terms in the event description, for example, by identifying parsed tokens. The event description analyzer 214 may perform stemming, for example, by reducing words in the event description to their stem word or root word. The event description analyzer 214 may perform synonymization, for example, by identifying synonyms of terms in the event description. The event description analyzer 214 may perform stop word removal, for example, by removing commonly occurring words from the event description (e.g., by removing "the", "a", or the like).

The consideration set generator 216 generates a consideration set of event records 232. The consideration set generator 216 may identify event records 232 based on tokens generated by the event description analyzer 214. The consideration set generator 216 may identify the consideration set by matching terms of the event description with terms in the event records 232. An event record 232 may include an application state trigger 224. The application state trigger 224 may specify an application name 224-1, and an application state 224-2 for the application. An event record 232 may include a sensor trigger 226. The sensor trigger 226 may include a sensor name 226-1, and a sensor measurement value 226-2 for the sensor.

The event description may specify an application name. The consideration set generator 216 may include an event record 232 in the consideration set, for example, if the application name 224-1 matches one or more terms in the event description. For example, an event description may specify "music player playing workout playlist". The consideration set generator 216 may include an event record 232 in the consideration set, for example, if the application name 224-1 refers to the music player application.

The event description may specify an application state. The consideration set generator 216 may include an event record 232 in the consideration set, for example, if the application state 224-2 matches one or more terms in the event description. For example, the event description may specify "playing workout playlist". The consideration sent generator 216 may include an event record 232 in the consideration set, for example, if the application state 224-2 refers to the workout playlist.

The event description may include a portion of a sensor name. The consideration set generator 216 may include an event record 232 in the consideration set, for example, if the sensor name 226-1 matches one or more terms specified in the event description. For example, an event description may specify "heart rate above 165". The consideration set generator 216 may include an event record 232 in the consideration set, for example, if the sensor name 226-1 refers to a heart rate sensor.

The event description may include a sensor measurement value. The consideration set generator 216 may include an event record 232 in the consideration set, for example, if the sensor measurement value 226-2 matches one or more terms in the event description. For example, the event description may specify "hot day". The consideration set generator 216 may include an event record 232 in the consideration set, for example, if the sensor measurement value 226-2 refers to a temperature reading that is higher than the average daily temperature reading. The consideration set generator 216 may generate the consideration set based on a comparison the event records 232 with the tokens generated by the event description analyzer 214.

The event record selector 218 may select an event record 232 from the consideration set. The event record selector 218 may score the event records 232 (e.g., each event record 232) in the consideration set. The event record selector 218 may select the event record with the highest score. The score of an event record 232 may indicate a qualitative property or a quantitative property of an event represented by the event record. For example, the score of an event record may indicate a relevance of the event record to the event description. The score of an event record may indicate a popularity of an event represented by the event record. The score of an event record may indicate an occurrence frequency of an event represented by the event record. The score of an event record may indicate a probability of occurrence of an event represented by the event record.

The event record selector 218 may score event records based on one or more scoring features. The scoring features may be associated with the event record and/or the event description. Example scoring features may include an event record scoring feature ("record scoring feature", hereinafter), a description scoring feature, and/or a record-description scoring feature.

A record scoring feature may be associated with an event record. A record scoring feature may include data associated with an event. For example, a record scoring feature may include application state triggers 224 and/or sensor trigger 226 from the event record 232. A record scoring feature may include parameters related to the event. A record scoring feature may include data that indicates a popularity of an event. For example, a record scoring feature may indicate a number of event occurrences within a period of time (e.g., within the last day, week, month, or year).

A description scoring feature may be associated with an event description. A description scoring feature may include data associated with the event description. Example description scoring features may include a number of words in the event description, a popularity of the event description, and/or an expected frequency of the words in the event description. A record-description scoring feature may include data that may be generated based on data associated with an event record in the consideration set and an event description. A record-description scoring feature may include parameters that indicate a number of matches between the terms of the event description and the event record in the consideration set.

The event record selector 218 may score an event record based the record scoring feature(s), the description scoring feature(s), and/or the record-description scoring feature(s). The event record selector 218 may include machine learned model(s). The machine learned model may include a supervised learning model, a semi-supervised learning model, or an unsupervised learning model. The machine learned model may be configured to receive the scoring features. The machine learned model may score events records 232 based on record scoring features, description scoring features, and/or record-description scoring features.

The event record selector 218 may determine a feature vector for an event record 232. The event record selector 218 may determine the feature vector for an event record 232 based on information included in the event record 232 and the event description. The feature vector may include record scoring features, description scoring features, and/or record-description scoring features. The event record selector 218 may use the feature vector as an input for a machine-learned regression model to calculate a score for the event record 232. The machine-learned regression model may include a set of decision trees (e.g., gradient boosted decision trees). The machine-learned regression model may include a logistic probability formula. A machine learned task can be implemented as a semi-supervised learning task. In a semi-supervised task, a portion of the training data may be labeled with human-curated scores, and the remaining training data may be used without human-curated scores.

The event record selector 218 may select the event record with the highest score. The event record selector 218 may send the selected event record 232 to the event notification generator 228. The event record selector 218 may retrieve the application state trigger(s) 224 and/or the sensor trigger(s) 226 from the selected event record 232. The event record selector 218 may send the application state trigger(s) 224 and/or the sensor trigger(s) from the selected event record 232 to the event notification generator 228.

In some scenarios, the event record identifier 212 may not be able to identify an event record 232 from the event data store 230. The event record identifier 212 may not find a suitable event record, for example, if the event description includes terms that do not match with the application state triggers 224 and the sensor triggers 226 stored in the event records 232. The event record identifier 212 may determine that a suitable event record does not exist in the event data store 230, for example, when the highest score for event records in the consideration set is below a threshold score (e.g., below 0.5). The event record identifier 212 may notify the event record generator 220 that the event record identifier 212 was not able to identify an event record 232 from the event data store 230.

Figure 2C:
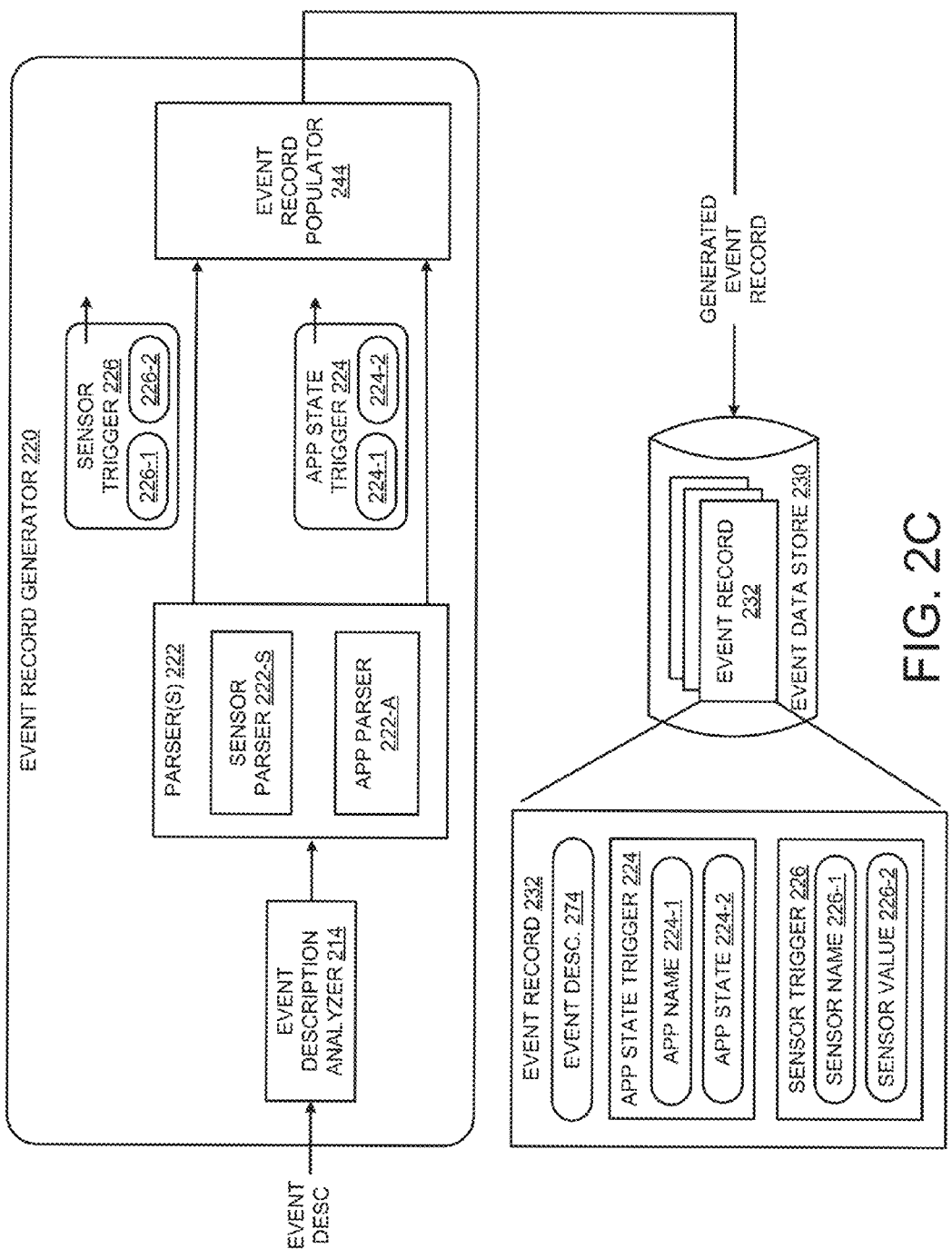
FIGS. 2C and 2D are block diagrams of example event record generator of FIG. 2A.

FIG. 2C illustrates an example event record generator 220. The event record generator 220 may include the event description analyzer 214, one or more parsers 222, and an event record populator 244. The event description analyzer 214 may receive an event description and generate tokens. The parser(s) 222 may use the tokens to determine triggers that indicate an occurrence of the event. For example, the parser(s) 222 may determine sensor trigger(s) 226, and application state trigger(s) 224. The parsers 222 may include a sensor parser 222-S, and an application parser 222-A.

The sensor parser 222-S may determine the sensor trigger(s) 226. The sensor parser 222-S may determine the sensor trigger 226 by comparing tokens with sensor names. The sensor parser 222-S may use a sensor look-up table to identify a sensor name 226-1 among the tokens. The sensor look-up table may include a list of sensor names. The sensor took-up table may include potential sensor measurement values that a sensor can record. The sensor parser 222-S may identify a sensor measurement value 226-2 in the tokens by comparing the tokens with the sensor measurement values stored in the sensor look-up table. The sensor parser 222-S may include multiple sensor parsers, each sensor parser may correspond with a different sensor. For example, the sensor parser 222-S may include a heart rate sensor parser, a blood glucose sensor parser, a temperature sensor parser, an ambient light sensor parser, or the like.

The application parser 222-A may determine the application state trigger(s) 224. The application parser 222-A may determine the application state trigger 224 by comparing tokens with application names. The application parser 222-A may use an application look-up table to identify an application name 224-1 among the tokens. The application took-up table may include a list of application names. The application look-up table may include potential application states that an application may have. The application parser 222-A may identify an application state 224-2 in the tokens by comparing the tokens with the application states stored in the application look-up table. The application parser 222-A may include multiple application parsers, each application parser may correspond with a different application. For example, the application parser 222-A may include a music player application parser, a social networking application parser, a navigation application parser, a messaging application parser, or the like. Appendix A illustrates example pseudo-code for an application parser (e.g., an application name parser).

The event record populator 244 creates an event record 232, and populates the event record 232. The event record populator 244 may receive the sensor trigger(s) 226 and/or the application state trigger(s) 224. The event record populator 244 may use the sensor trigger(s) 226 and/or the application state trigger(s) 224 to populate the event record 232. The event record populator 244 may store the generated event record in the event data store 230.

Figure 2D:
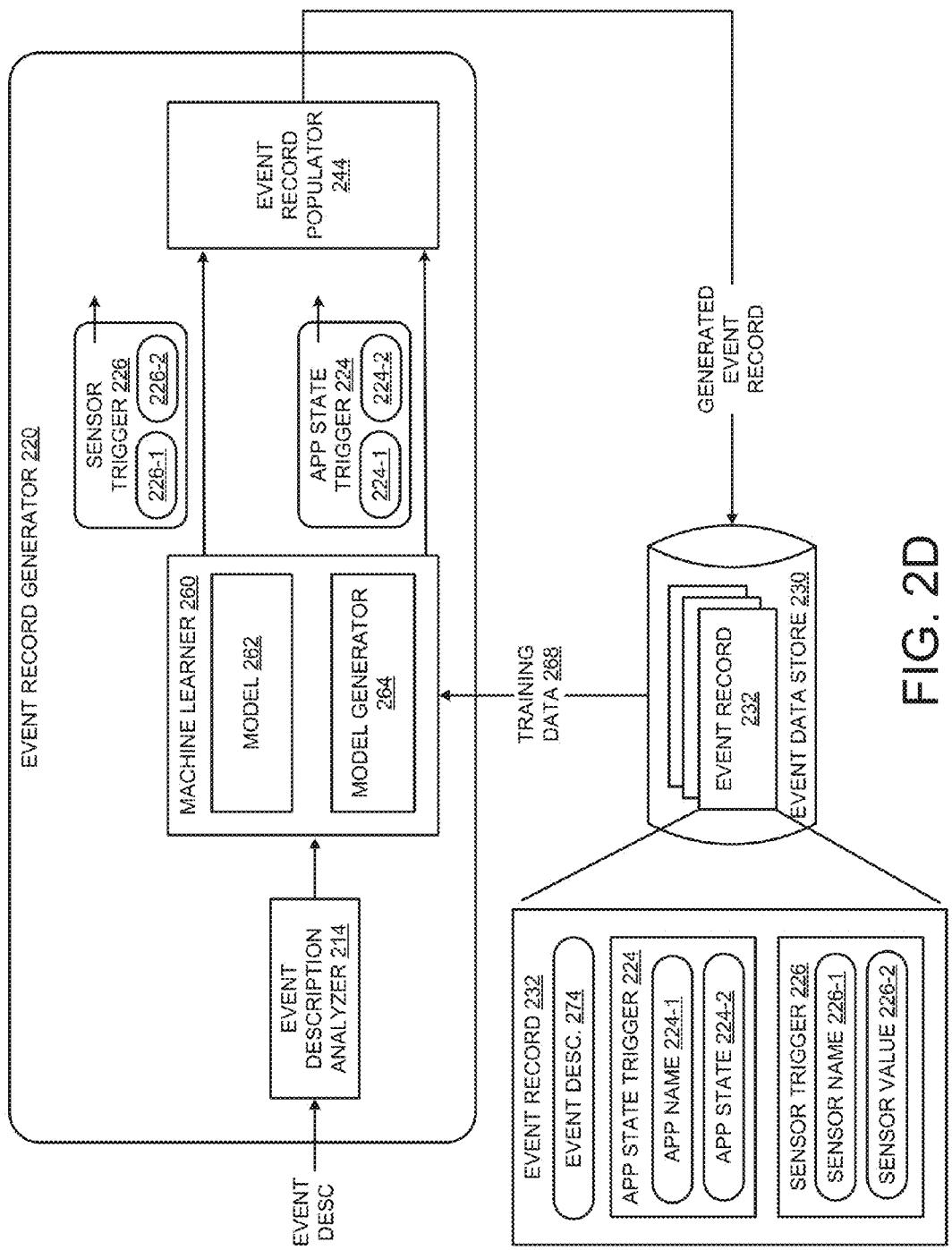

FIG. 2D illustrates another example implementation of the event record generator 220. The event record generator may include a machine learner 260. The machine learner 260 may include a supervised, semi-supervised, or an unsupervised machine learner. The machine learner 260 may use decision tree learning, associated rule learning, artificial neural networks, inductive logic programming, support vector machines, clustering, Bayesian networks, reinforcement learning, representation learning, similarity and metric learning, and/or sparse dictionary learning. The machine learner 260 may determine the application state trigger(s) 224 and/or the sensor trigger(s) 226 using a model 262. The machine learner 260 may include a model generator 264. The model generator 264 may generate the model 262. The model generator 264 may use the event records 232 as training data 268 to generate the model 262.

The training data 268 may include labeled training data, for example, as in supervised learning. Labeled training data may identify a structure of the event records. Labeled training data may identify the structure of the event records through feature vectors. The feature vectors may be curated by an operator (e.g., a human operator). The training data 268 may include unlabeled training data, for example, as in unsupervised learning. The model generator 264 may receive the event records 232. The model generator 264 may determine the model 262 by inferring a function that receives an event description 274 as input and outputs application state triggers 224 and sensor triggers 226. The training data 268 may include a combination of labeled training data, and unlabeled training data, for example, as in semi-supervised learning.

The model generator 264 generates the model 262. The model generator 264 may generate the model 262 by inferring a function that maps the event description 274 to the application state triggers 224 and the sensor triggers 226. The model generator 264 may receive input from an operator. The model generator 264 may generate the model 262 based on the input from the operator. The model generator 264 may adjust the model 262 based on input received from the operator. The operator may evaluate (e.g., score) the output generated by the model 262. The model generator 264 may adjust the model 262, for example, until the model generator 264 receives a threshold score from the operator.

The model 262 generates the application state trigger(s) 224 and the sensor trigger(s) 226. The model 262 may include a function that maps the event description to the application state trigger(s) 224, and the sensor trigger(s) 226. The model 262 may send the application state trigger(s) 224, and the sensor trigger(s) 226 to the event record populator 244. The event record populator 244 may receive the applications state trigger(s) 224, and the sensor trigger(s) 226 from the machine learner 260. The event record populator 244 may create an event record 232. The event record populator 244 may populate the event record 232 with the application state trigger(s) 224, and the sensor trigger(s) 226 generated by the machine learner 260. The event record populator 244 may store the populated event record 232 in the event data store 230. The event record populator 244 may send the populated event record 232 to the event notification generator 228.

Figure 3:
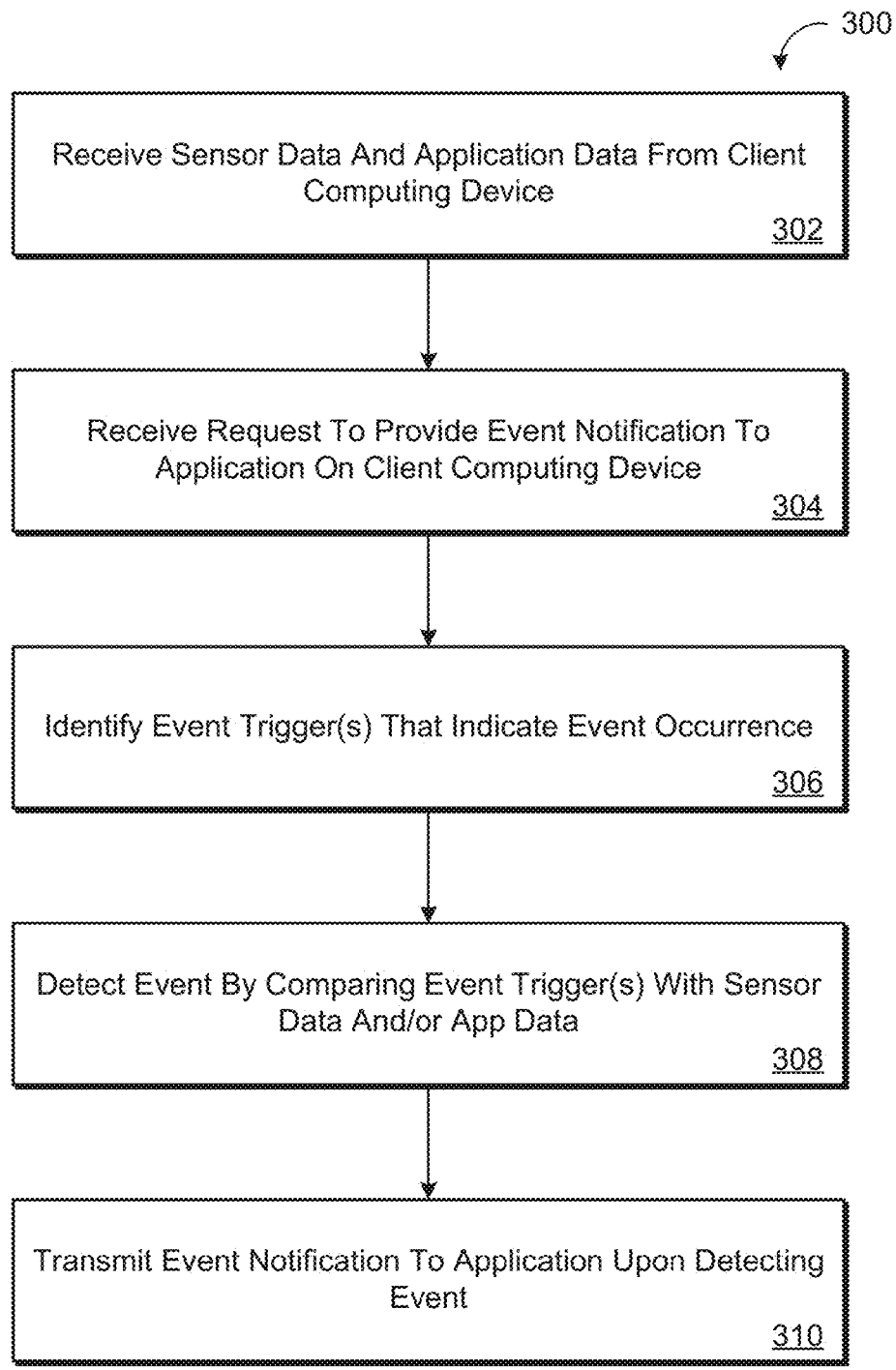
FIG. 3 is a block diagram that illustrates an example method for generating event notifications for applications.

FIG. 3 illustrates an example method 300 for generating event notifications. At 302, a server receives sensor data and application data from a client computing device. The sensor data may identify one or more sensors. The sensor data may include a sensor measurement value for the sensor(s). The application data may identify one or more applications. The application data may include an application state for the application. For example, the server 100 may receive the sensor data 144, and the application data 148 from the client computing device 140.

At 304, the server receives a request to provide event notifications to an application on a client computer device. The request may include an event description. The event description may be in natural language. The event description may include human-readable terms, for example, instead of software program code instructions. The server may receive the request from a developer portal. The server may receive the request from the client computing device (e.g., from the application, or a user of the client computing device). The request may be perpetual. For example, the request may instruct the server to send event notifications to the application in response to each occurrence of the event.

The request may be time-limited. The request may instruct the server to send event notifications to the application during a time period (e.g., next 1 year). The request may include payment information. The server may charge a fee to provide event notifications to the application. The request may include a financial account identifier (e.g., credit card information). The server may deduct the fee for providing the event notifications from the financial account identified by the request. The request may be a one-time request. The server may send the event notification to the application upon detecting the first occurrence of the event.

At 306, the server identifies event triggers that indicate an occurrence of the event. The server may identify sensor triggers (e.g., sensor triggers 226) and application state triggers (e.g., application state triggers 224). A sensor trigger may identify a sensor and a sensor measurement value that indicates the occurrence of the event. An application state trigger may identify an application and an application state that indicates the occurrence of the event. The server may identify the triggers by performing a search for an event record in an event record data store based on the event description. For example, the server may search for an event record 232 in the event data store 230. The server may identify the triggers by using parsers (e.g., parsers 222). The parsers may parse the event description to identify the sensor trigger(s) and/or the application state trigger(s). The server may identify the triggers by using a machine learner (e.g., machine learner 260).

At 308, the server may detect an occurrence of the event. The server may detect occurrence of the event by comparing the event triggers with sensor data and application data. The server may detect a sensor trigger when a sensor measurement value in the sensor data matches (e.g., equals or approximately equals, such that the sensor measurement is within a tolerance) a sensor measurement value in the sensor trigger.

The server may detect an application state trigger when an application state in the application trigger matches (e.g., equals, or approximately equals) an application state in the application data. The server may detect an application function trigger when an application function in the application trigger matches (e.g., equals or approximately equals) an application function in the application data. The server may detect the application state trigger by comparing function parameters (e.g., parameters included in an application access mechanism, such as a uniform resource locator (URL)). The server may detect the application state trigger, for example, if a threshold number of function parameters (e.g., 95% of function parameters) match between the application states indicated by the application data and the application state trigger. The server may the application state trigger by comparing graphical user interface (GUI) elements. The server may detect the application state trigger, for example, if a threshold number of GUI elements (e.g., 95% of GUI elements) match between the application states indicated by the application data and the application state trigger.

At 310, the server may transmit the event notification to the application. The server may transmit the event notification upon detecting the occurrence of the event. The event notification may indicate the occurrence of the event. The event notification may include a time at which the event occurred. The event notification may indicate the sensor trigger that triggered the event. The event notification may indicate the application state trigger that triggered the event. The event notification may include a counter value that indicates a running count of the number of occurrences of the event.

The server may determine whether the application has been granted access to the event notifications (e.g., permission to receive the event notification). The server may transmit the event notification in response to determining that the application has been granted access to the event notifications. The server may determine that the application has not been granted permission to receive the event notification. The server may request the client computing device to obtain permission from the user to allow the application to receive event notifications. The server may transmit the event notifications in response to the user granting permission for the application to receive event notifications.

Figure 4C:
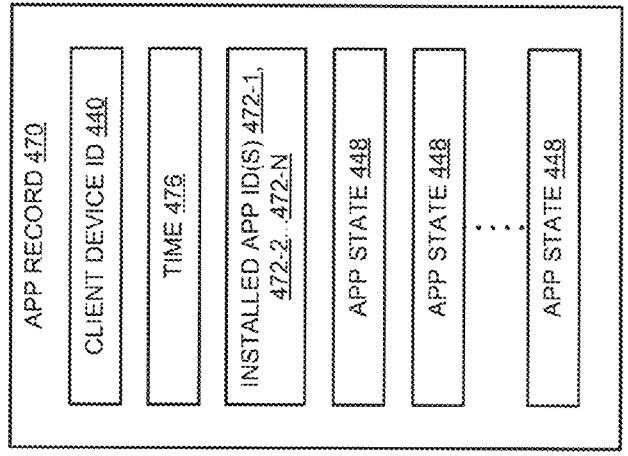
FIG. 4C is a diagram illustrating an example application data record for a client computing device.
Figure 4B:
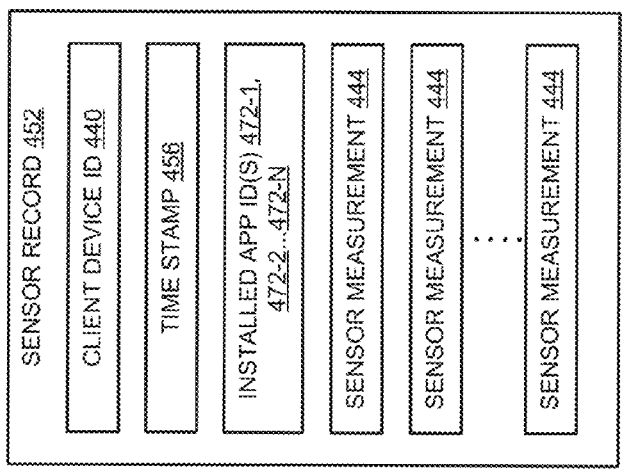
FIG. 4B is a diagram illustrating an example sensor data record for a client computing device.
Figure 4A:
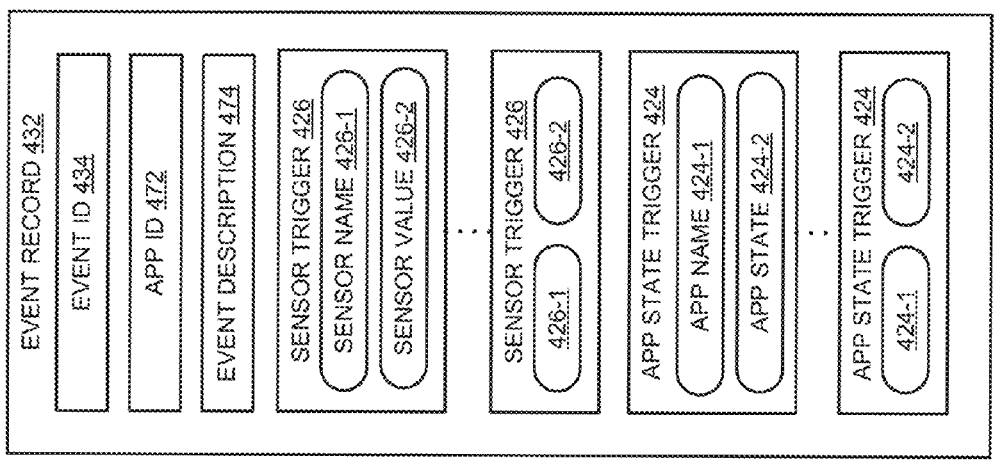
FIG. 4A is a diagram illustrating an example event record for an event.

FIG. 4A illustrates an example event record 432 that may represent an event. The event record 432 illustrates an example representation of the event record 232 shown in FIG. 2. The event record 432 may be stored in the event data store 230. The event record 432 may include an event identifier (ID) 434. The server may generate the event ID 434 to distinguish different event records 432. The event record 432 may include an application ID 472 (e.g., application ID 172). The application ID 472 may identify an application that receives event notifications upon an occurrence of the event. The event record 432 may include an event description 474 (e.g., event description 174).

The event record 432 may include one or more sensor triggers 426. The sensor trigger 426 may represent the sensor trigger 226 shown in FIG. 2. The sensor trigger 426 may include a sensor name 426-1, and a sensor measurement value 426-2. Each sensor trigger 426 may correspond with a different sensor. For example, a sensor trigger 426 corresponding with a heart rate sensor may include "heart rate sensor" as a sensor name 426-1, and ">160" as a sensor measurement value 426-2. A sensor trigger 426 corresponding with a microphone may include "microphone" as a sensor name 426-1, and ">50 dB" as a sensor measurement value 426-2. The sensor triggers 426 may be generated by an operator (e.g., human operator), using parsers (e.g., parsers 222), and/or using a machine learner (e.g., machine learner 260).

The event record 432 may include one or more application state triggers 424. The application state trigger 424 may represent the application state trigger 224. The application state trigger may include an application name 424-1, and an application state 424-2. Each application state trigger 424 may correspond with a different application. For example, an application state trigger 424 corresponding with a music player application may include "music player" as an application name 424-1, and "playing workout playlist" as an application state 424-2. An application state trigger 424 corresponding with a messaging application may include "Messenger" as an application name 424-1, and "chatting with Sarah" as an application state 424-2. The application state triggers 424 may be generated by an operator (e.g., human operator), using parsers (e.g., parsers 222), and/or using a machine learner (e.g., machine learner 260).

FIG. 4B illustrates an example sensor record 452. The sensor record 452 may represent the sensor record 252. The sensor record 452 may store sensor data (e.g., sensor data 144) received from a client computing device (e.g., client computing device 140). The sensor record 452 may include a client device ID 440. The client device ID 440 may identify a client computing device that sends the sensor data stored in the sensor record 452. The client device ID 440 may include an email address associated with a user of the client computing device, a personal identification number (PIN) assigned to the client computing device, an International Mobile Station Equipment Identity (IMEI) of the client computing device, an Internet Protocol (IP) address of the client computing device, a media access control (MAC) address of the client computing device, a telephone number of the client computing device, or the like.

The sensor record 452 may include a timestamp 456. The timestamp 456 may refer to a time at which the sensor measurement values are captured at the client computing device. The timestamp 456 may refer to a time at which the client computing device sent the sensor data to the server. The timestamp 456 may refer to a time at which the server received the sensor measurement values from the client computing device. The sensor record 452 may include application IDs 472-1, 472-2 . . . 472-N. The application IDs 472-1, 472-2 . . . 472-N may refer to applications (e.g., applications 146) that are installed on the client computing device.

The sensor record 452 may include sensor measurements 444. The sensor measurements 444 may represent sensor data 144. Each sensor measurement 444 may include a sensor measurement value for a different sensor (e.g., sensor 142) in the client computing device. For example, a sensor measurement 444 may include a heart rate recorded by a heart rate sensor. A sensor measurement 444 may include a sound level in decibels recorded by a microphone. A sensor measurement 444 may include a location determined by a location sensor.

FIG. 4C illustrates an example application record 470. The application record 470 may represent the application record 272. The application record 470 may store application data (e.g., application data 148) received from a client computing device (e.g., client computing device 140). The application record 470 may include the client device ID 440. The application record 470 may include a time 476. The time 476 may refer to a time at which the application data is captured at the client computing device. The time 476 may refer to a time at which the client computing device sent the application data to the server. The time 476 may refer to a time at which the server received the application data from the client computing device. The application record 470 may include the application IDs 472-1, 472-2, . . . 472-N.

The application record 470 may include application states 448. The application states 448 may represent application data 148. Each application state 448 may refer to an application state for a different application (e.g., application 146) installed on the client computing device. For example, an application state 448 may refer to a 'playing workout playlist' state of a music player application. An application state 448 may refer to a 'chatting with Sarah' state of a Messenger application. An application state 448 may refer to a 'working out' state of a fitness application. An application state 448 may refer to a 'navigating to work' state of a navigation application. An application state 448 may refer to a 'received 100 likes' state of a Facebook application.

An application state 448 may refer to a screen displayed on the client computing device at time 476. Application states 448 may refer to applications executing on the client computing device at time 476. Application states 448 may refer to applications that a user of the client computing device is using at time 476. An application state 448 may refer to a message received or sent by a messaging application at time 476. An application state 448 may refer to an application function that a user of the client computing device uses at time 476 (e.g., playing workout playlist). An application state 448 may refer to an application activity that the application performs at time 476 (e.g., sending message to girlfriend, navigating to work, or the like).

Figure 5:
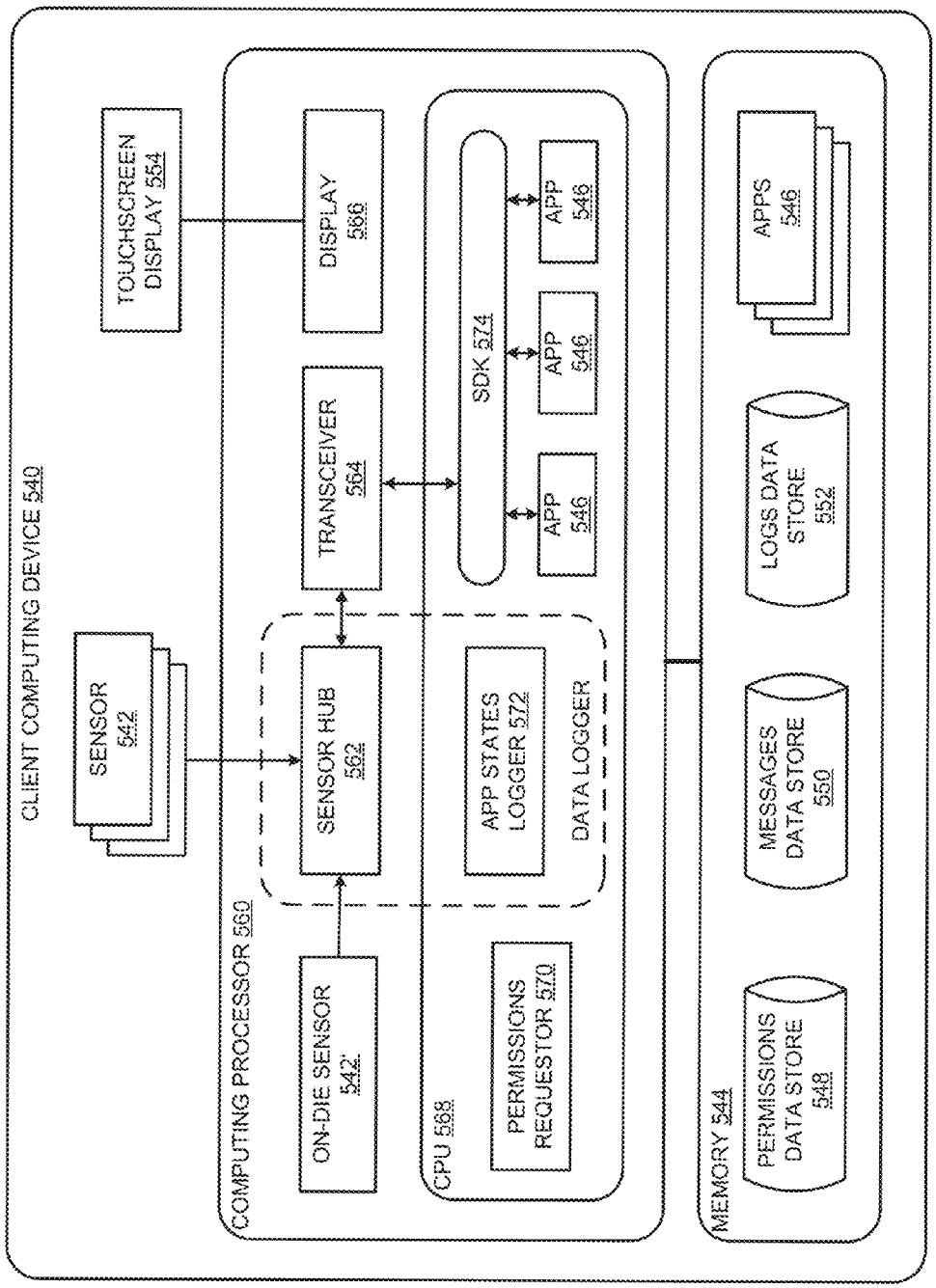
FIG. 5 is a block diagram that illustrates an example client computing device.

FIG. 5 illustrates an example client computing device 540. The client computing device 540 illustrates an example implementation of the client computing device 140 shown in FIG. 1. The client computing device may include sensors 542, a memory 544 that stores applications 546, a touchscreen display 554, and a computing processor 560. The sensors 542 may implement the sensors 142. The applications 546 may implement the applications 146.

The computing processor 560 may include an on-die sensor 542', a sensor hub 562, a transceiver 564, display circuitry 566, and a central processing unit (CPU) 568. The on-die sensor 542' may include a location sensor, for example, Global Positioning System (GPS) and/or Global Navigation Satellite System (GLONASS). The on-die sensor 542' may include an accelerometer, a magnetometer, gyroscope, or the like. The sensors 542 may be implemented as on-die sensors 542'. References to the sensors 542 include the on-die sensor 542'.

The sensor hub 562 may manage the sensors 542. The sensor hub 562 may receive sensor data (e.g., sensor data 144) from the sensors 542. The sensor hub 562 may determine when to turn on, or turn off the sensors 542. The sensor hub 562 may turn on a sensor 542 and command the sensor 542 to record a sensor measurement. The sensor hub 562 may turn off the sensor 542, for example, to conserve power. The sensor hub 562 may receive sensor data periodically (e.g., once every hour, once every minute, or the like). The sensor hub 562 may capture sensor data in response to receiving a request (e.g., from a server via the transceiver 564).

The transceiver 564 enables electronic communication with a network network 190, or base station 192). The transceiver 564 main include a cellular transceiver, for example, a LTE transceiver, a LTE-Advanced transceiver, or a 5G $5^{th}$ generation mobile network) transceiver. The transceiver 564 may include a Wi-Fi transceiver. The transceiver 564 may include a ZigBee transceiver, a Bluetooth transceiver (e.g., Bluetooth Low Energy transceiver), a NEC transceiver, or the like. The transceiver 564 may communicate with the network via wired communications. For example, the transceiver 564 may communicate with the network via an Ethernet cable, a fiber-optic cable, a USB cable, or the like.

The display circuitry 566 may cause the touchscreen display 554 to display information. The display circuitry 566 may receive user input (e.g., user selections) from the touchscreen display 554. The display circuitry 566 may include a display driver. The display driver may drive the touchscreen display 554. For example, the display circuitry 566 may include a Light Emitting Diode (LED) driver that may drive a LED display. The display circuitry 566 may drive a stereoscopic display (e.g., an autostereoscopic 3D display).

The CPU 568 may include an ARM processor based on a reduced instruction set computing (RISC) architecture. The CPU 568 may include multiple cores (e.g., dual-core, quad-core, or octa-core). The CPU 568 may execute computer-readable instructions stored in the memory 544. When the CPU 568 executes computer-readable instructions, the CPU may implement a permissions requester 570, an application states logger 572, and a software development kit (SDK) 574. The CPU 568 may execute the applications 546.

The application states logger 572 may log application states of the applications 546. The application states logger 572 may be an application (e.g., a preinstalled application). The application states logger 572 may be implemented by an operating system installed on the client computer device 540. The application states logger 572 may be a service that the client computer device 540 may subscribe to. The application state logger 572 may execute as a background operation, for example, so that a user may be able to use the client computing device 540.

The application state logger 572 may log the usage of an application 546. For example, the application states logger 572 may log times during which an application 572 is used. The application state logger 572 may log an application function that an application is performing. The application state logger 572 may log an application function that a user of the client computing device is using. The application state logger 572 may log an application state by capturing a screenshot of an application screen that is displayed on the touchscreen display 554. The application state logger 572 may store the logged application states in a logs data store 552. The application state logger 572 may tog messages in a messages data store 550. For example, the application state logger 572 may monitor a messaging application and store messages that are communicated via the messaging application. In another example, the application state logger 572 monitors an email application and store email communicated via the email application in the messages data store 550. The sensor hub 562 and the application states logger 572 may be referred to as a data logger (e.g. data logger 150).

The computing processor 560 may transmit data logged by the data logger to a server (e.g., server 100) via the transceiver 564. The computing processor 560 may transmit the application data (e.g., application states) logged by the application states logger 572. The computing processor 560 may transmit the sensor data (e.g., sensor measurement values) recorded by the sensor hub 562. The computing processor 560 may transmit the sensor data and the application data periodically (e.g., once an hour, once a minute, or once a second). The computing processor 560 may transmit the application data and the sensor data in response to receiving a request from the server. The computing processor 560 may transmit the application data and the sensor data in a message (e.g., in a single message). The computing processor 560 may transmit the application data and the sensor data as separate messages.

The CPU 568 may implement the SDK 574. A server may provide the SDK 574. The SDK 574 may include a service that an application 546 may subscribe to. Applications 546 executing on the CPU 568 may interact with the SDK 574. The applications 546 may subscribe to an event notification via the SDK 574. The applications 546 may request event notifications via the SDK 574. The applications 546 may unsubscribe to event notifications via the SDK 574. The applications 546 may receive event notifications via the SDK 574. The SDK, 574 may include or more application programming interfaces (APIs). The SDK 574 may include one or more libraries or the like.

The CPU 568 may implement a permissions requester 570. The permissions requester 570 may request permission to log the sensor data and the application data. The permissions requester 570 may request permission to transmit the sensor data and the application data to the server. The permissions requester 570 may request permission to provide event notifications to the applications 546. The permissions requester 570 may store the permissions in a permissions data store 548.

The SDK 574 may interact with the permissions requester 570. The SDK 574 may request permission, via the permissions requester 570, prior to providing event notifications to an application 546. The SDK 574 may access the permissions data store 548. The SDK 574 may determine whether an application 546 has permission to receive an event notification. The SDK 574 may provide the application 546 with the event notification in response to determining that the application 546 has permission to receive the event notification. The SDK 574 may instruct the permissions requester 570 to request permission in response to an application 546 not having permission to receive the event notification.

Figure 6:
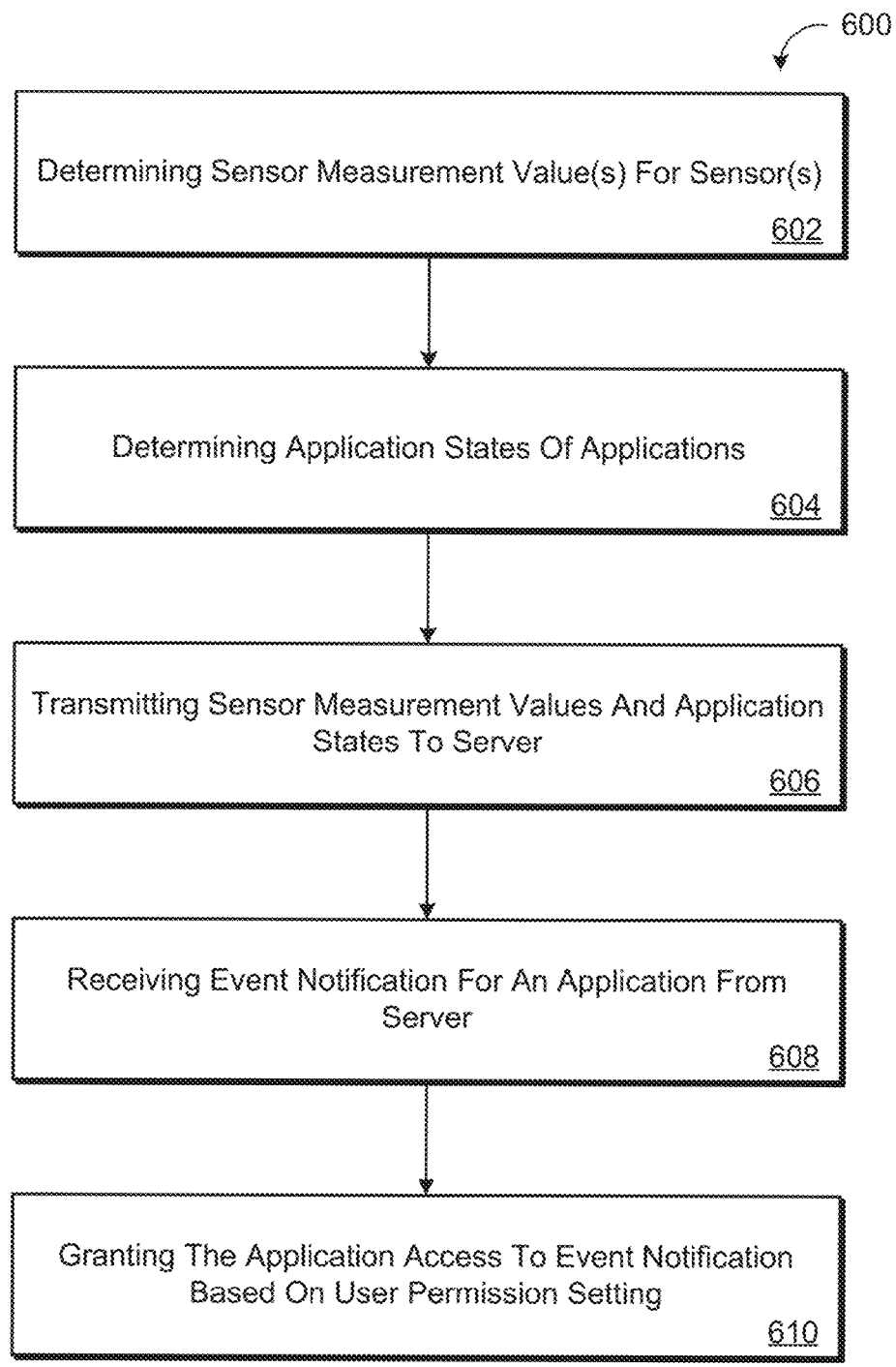
FIG. 6 is a block diagram of an example method for receiving event notifications for an application installed on a client computing device.

FIG. 6 illustrates an example method 600 for receiving event notifications at a client computing device (e.g., client computing device 540). At 602, a client computing device determines sensor measurement values for sensors in the client computing device. The client computing device may include a sensor hub (e.g., sensor hub 562) that records the sensor measurement values. The client computing device may determine the sensor measurement values periodically. The client computing device may determine the sensor measurement values in response to a request (e.g., a request from a server).

At 604, the client computing device determines application states of applications installed on the client computing device. The client computing device may include an application hub (e.g., application states logger 572). The application hub may determine states of applications that are executing on a computing processor of the client computing device. The client computing device may determine the application states periodically. Additionally or alternatively, the client computing device may determine the application states in response to a request from a server. The client computing device may store the determined application states in a data store. The client computing device may send a batch of stored application states, for example, instead of sending individual application states, which may help conserve battery power.

At 606, the client computing device transmits the sensor measurement values and the application states to a server. The client computing device may transmit the sensor measurement values and the applications states together (e.g., in the same JSON file). The client computing device may transmit the sensor measurement values and the application states separately in separate messages. The client computing device may transmit a client computing device ID with the sensor data (e.g., sensor measurement values), and the application data (e.g., application states). The client computing device ID identifies the client computing device. The client computing device may transmit a list of application identifies with the sensor data and the application data. The application identifiers may correspond with applications installed on the client computing device.

At 608, the client computing device receives an event notification for an application from the server. The event notification indicates the occurrence of an event. The client computing device may receive the event notification in response to each occurrence of the event. The client computing device may receive the event notification in response to the first occurrence of the event. The client computing device may receive the event notification during a time period (e.g., during a 1 year paid subscription period).

At 610, the client computing device grants the application access to the event notification based on user permission settings. The client computing device may include a permissions data store that may store the permission settings. The permission settings may indicate that the application is permitted to receive the event notification. The client device may provide the notification to the application in response to determining that the application is permitted to receive the event notification. The client computing device may determine that a permission setting for the application does not exist. The client computing device may request permission to provide the event notification to the application, for example, if permission has neither been denied nor been granted. The client computing device may suppress the event notification, for example, if permission has been denied to the application. The client computing device may suppress the event notification by purging the event notification. The client computing device may transmit the suppressed event notification back to the server, for example, to indicate that the application is not permitted to receive the event notification.

Figures 7A, 7B:
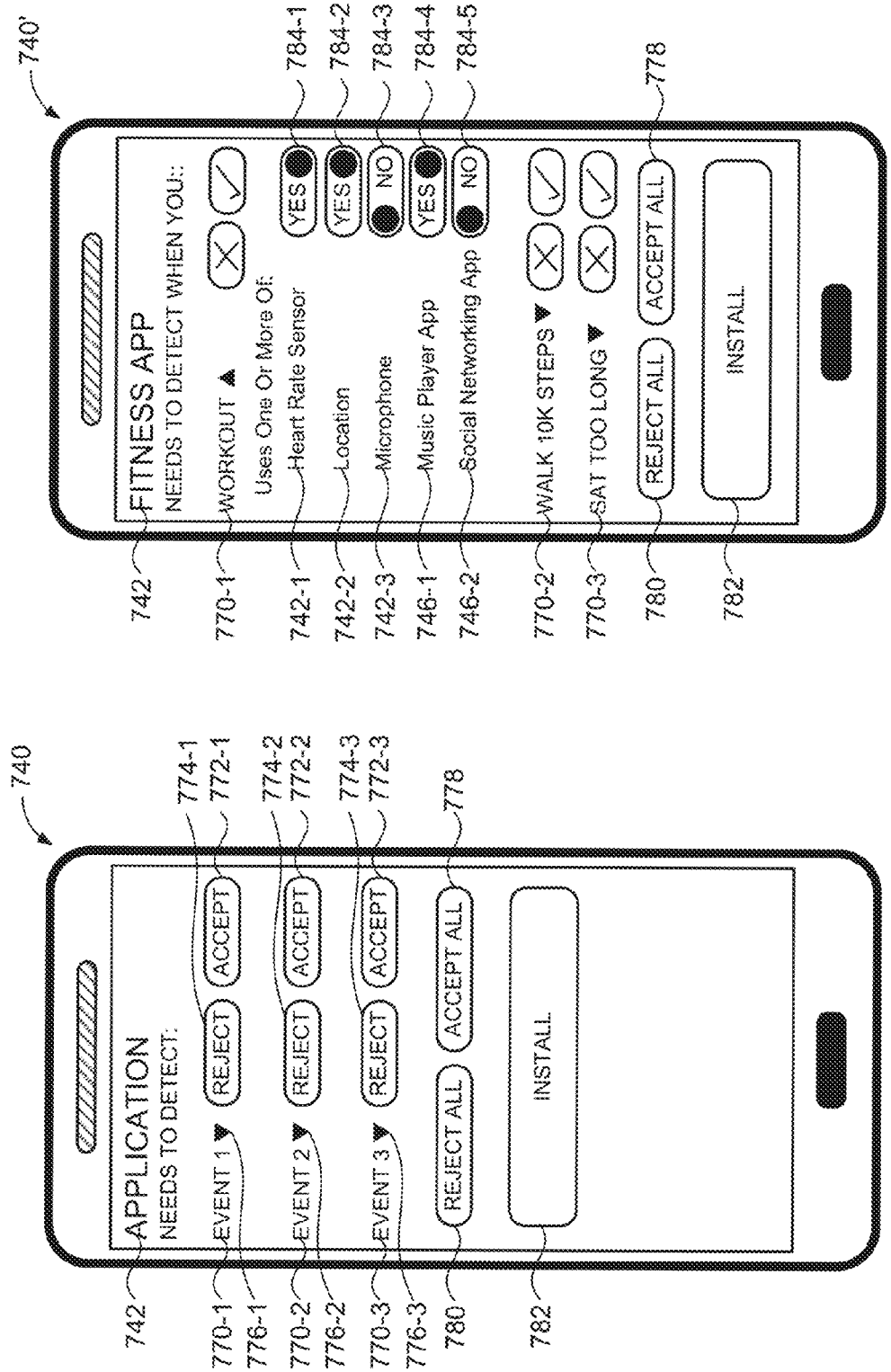
FIGS. 7A and 7B are schematic diagrams illustrating example permission request screens on a client computing device.

FIGS. 7A and 7B illustrate example permissions screens 740, and 740, respectively. A client computing device (e.g., client computing device 140) may display the permissions screen 740 to request permission to provide event notifications to an application 742. A user of the client computing device may use the permissions screen 740 to allow, or deny an application 742 to detect events. The permissions screen 740 may display events 770-1, 770-2, and 770-3. For example, a fitness application may request event notifications to notify the fitness application that the user of the client computing device is working out. The fitness application may request event notifications to notify the fitness application that the user has walked 10,000 steps. The fitness application may request event notifications to notify the fitness application that the user has sat for too long.

The permissions screen 740 may display GUI elements 772-1, 772-2, and 772-3 that may be selected to allow an application 742 to receive event notifications for the events 770-1, 770-2, and 770-3, respectively. The GUI elements 772-1, 772-2, and 772-3 may include buttons that may be labeled 'ACCEPT', or the like. The application 742 may receive event notifications that notify the application 742 about an occurrence of the event 770-1, for example, if the client computing device receives a selection of the GUI element 772-1. For example, the fitness application may receive event notifications that notify the fitness application that the user may be working out, if the client computing device receives a selection of the GUI element 772-1.

The permissions screen 740 may display GUI elements 774-1, 774-2, and 774-3 that may be selected to deny the application 742 from receiving event notifications for the events 770-1, 770-2, and 770-3, respectively. The GUI elements 774-1, 774-2, and 774-3 may include buttons that may be labeled 'REJECT', or the like. The application 742 may not receive event notifications that notify the application 742 about an occurrence of the event 770-3, for example, if the client computing device receives a selection of the GUI element 774-3. For example, the fitness application may not receive event notifications that notify the fitness application that the user may have sat too long, if the client computing device receives a selection of the GUI element 774-3. The permissions screen 740 enables a user to allow the application 742 to detect some events, while denying the application 742 from detecting other events.

The permissions screen 740 may display GUI elements 776-1, 776-2, and 776-3 that may be selected to view more information about the events 770-1, 770-2, and 770-3, respectively. The permissions screen 740 may a display GUI element 778 that may be selected to allow the application 742 to detect all the events that the application has requested to detect. The GUI element 778 may include a button that may be labeled 'ACCEPT ALL', or the like. The permissions screen 740 may a display GUI element 780 that may be selected to deny the application 742 from detecting all the events that the application has requested to detect. The GUI element 780 may include a button that may be labeled 'REJECT ALL', or the like. The permissions screen 740 may display a GUI element 782 that may be selected to install the application 742.

FIG. 7B illustrates an example permissions screen 740'. The permissions screen 740' displays more information about the event 770-1. The client computing device may display the permissions screen 740' upon receiving a selection of the GUI element 776-1. The permissions screen 740' may display a list of sensors 742-1, 742-2, and 742-3 that may be used to detect the event 770-1. The permissions screen 740' may display a list of applications 746-1, and 746-2 that may be used to detect the event 770-1. The permissions screen 740' may display GUI elements 784-1, 784-2, and 784-3 that may be selected to grant or deny the usage of the sensors 742-1, 742-2, and 742-3 in detecting the event 7701. The permissions screen 740' may display GUI elements 784-4, and 784-5 that may be selected to allow or deny the use of the applications 746-1, and 746-2 in detecting the event 770-1.

The GUI elements 784-1 . . . 784-5 may include toggle switches. The client computing device may receive a selection to toggle the switch 784-1 to a 'YES' position. Toggling the switch 784-1 to the 'YES' position indicates that the sensor 742-1 may be used in detecting the event 770-1. The client computing device may receive a selection to toggle the switch 784-3 to a 'NO' position. Toggling the switch 784-3 to the 'NO' position indicates that the sensor 742-3 may not be used in detecting the event 770-1. The client computing device may receive a selection to toggle the switch 784-4 to the 'YES' position. The application 746-1 may be used to detect the event 770-1, for example, because the switch 784-4 is toggled to the 'YES' position. The client computing device may receive a selection to toggle the switch 784-5 to the 'NO' position. The application 746-2 may not be used to detect the event 770-1, for example, because the switch 784-5 is toggled to the NO position. Advantageously, the use of individual sensors and/or applications may be granted or denied to detect particular events requested by the application 742.

The client computing device may log sensor measurement values for the sensors 742-1, and 742-2, for example, because the toggle switches 784-1, and 784-2 are toggled to the 'YES' position. The client computing device may transmit the sensor measurement values for the sensors 742-1, and 742-2 to a server (e.g., server 100), for example, because the toggle switches 784-1, and 784-2 are toggled to the 'YES' position. The server may use the sensor measurement values from the sensors 742-1, and 742-2 to detect the event 770-1, for example, because the toggle switches 784-1, and 784-2 are toggled to the 'YES' position.

The client computing device may not log sensor measurement values for the sensor 742-3, for example, because the toggle switch 784-3 is toggled to the NO position. The client computing device may not transmit the sensor measurement values for the sensor 742-3 to the server, for example, because the toggle switch 784-3 is toggled to the 'NO' position. The server may not use the sensor measurement values from the sensor 742-3 to detect the event 770-1, for example, because the toggle switch 784-3 is toggled to the NO position.

The client computing device may log application data for the application 746-1, for example, because the toggle switch 784-4 is toggled to the 'YES' position. The client computing device may transmit the application data for the application 746-1 to a server (e.g., server 100), for example, because the toggle switch 784-4 is toggled to the 'YES' position. The server may use the application data from the application 746-1 to detect the event 770-1 for example, because the toggle switch 784-4 is toggled to the 'YES' position.

The client computing device may refrain from logging application data for the application 746-2, for example, because the toggle switch 784-5 is toggled to the 'NO' position. Further, the client computing device may refrain from transmitting the application data for the application 746-2 to a server (e.g., server 100), for example, because the toggle switch 784-5 is toggled to the 'NO' position. The server may not use the application data from the application 746-2 to detect the event 770-1, for example, because the toggle switch 784-5 is toggled to the 'NO' position.

Figure 8:
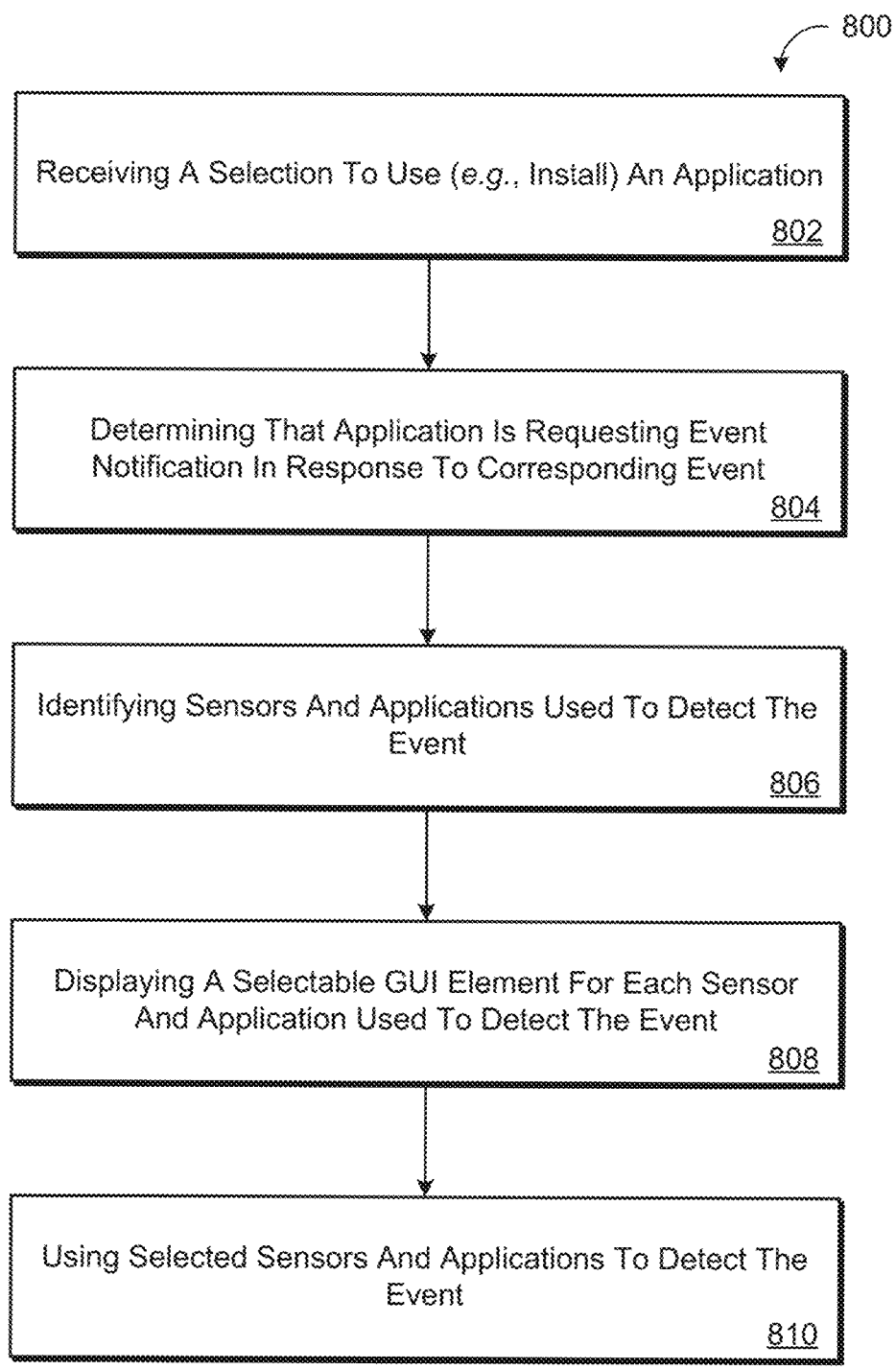
FIG. 8 is a block diagram of an example method for requesting permission to use sensors and applications in detecting events and generating event notifications.

FIG. 8 illustrates an example method 800 for obtaining permissions to use sensors and applications in detecting events. At 802, a client computing device receives a selection to use an application. The client computing device may receive a selection to install an application, for example, from a digital distribution platform. The client computing device may receive the selection to use the application by receiving a selection of an application icon displayed in an application tray, an application ribbon, or a home screen of the client computing device.

At 804, the client computing device determines that the application is requesting event notifications for corresponding events. The client computing device may determine that the application is requesting event notifications based on metadata associated with the application. For example, the client computing device may analyze a manifest file associated with the application. The client computing device may determine that the application is requesting event notifications based on information received from a server. For example, the client computing device may send an application ID to a server and receive an indication from the server that the application uses event notifications.

At 806, the client computing device identifies sensors and applications that are used to detect the event. The client computing device may identify the sensors and applications based on metadata associated with the application. The client computing device may identify the sensors and the applications based on a manifest file associated with the application. The client computing device may send an application ID or an event ID to a server, and receive a list of sensors and applications that are used to detect events.

At 808, the client computing device displays a selectable GUI element for each sensor and application that is used to detect the event. The GUI elements may include toggle switches that can be toggled to a 'YES' position, or a 'NO' position. Toggling a toggle switch to the 'YES' position may indicate an approval to use the sensor or the application associated with the toggle switch to detect the event. Toggling a toggle switch to the 'NO' position may indicate a rejection or a denial to use the application or the sensor associated with the toggle switch to detect the event. The GUI elements may include buttons, sliders, checkboxes, or the like.

At 810, the client computing device uses the selected sensors and applications to detect the event. The client computing device may update permission settings to indicate the sensors and applications that can be used to detect the event. The client computing device may use the sensors and the applications for which the corresponding toggle switches were switched to the 'YES' position. The client computing device may not use the sensors and the applications for which the toggle switches were switched to the 'NO' position. The client computing device may notify the server of the permission settings. The client computing device may instruct the server to use the applications and sensors that were approved for detecting the event. The client computing device may instruct the server to refrain from using the sensors and the applications that were denied for detecting the event.

The client computing device may record sensor data and application data for sensors and applications that are approved for use in detecting the event. The client computing device may transmit the sensor data and the application data for sensors and applications that were approved for use in detecting the event. The client computing device may refrain from recording data for sensors and applications that were rejected for use in detecting the event. The client computing device may refrain from transmitting sensor data and application data for sensors and applications not approved for detecting the event.

Figure 9:
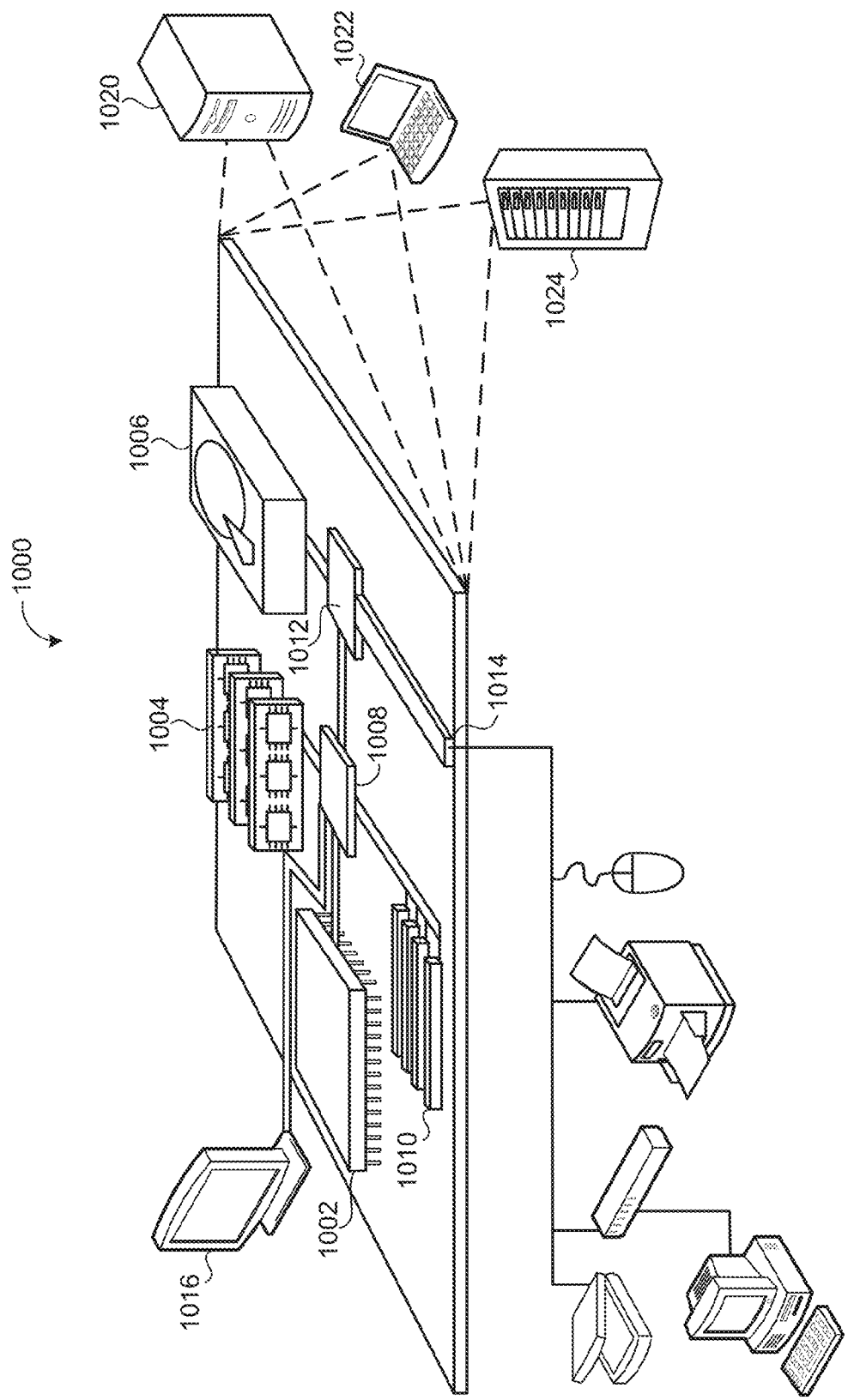
FIG. 9 is a block diagram that illustrates an example computing device that may be used to implement the server, or the client computing device.

FIG. 9 is a block diagram of an example computing device 1000 that may be used to implement the systems and methods described in this document. The computing device 1000 may be used to implement the server 100. The computing device 1000 may be used to implement the client computing device 140. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the disclosure described and/or claimed in this document.

The computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a graphical user interface (GUI) on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multiprocessor system).

The memory 1004 stores information within the computing device 1000. In one implementation, the memory 1004 is a computer-readable medium. In one implementation, the memory 1004 is a volatile memory unit or units. In another implementation, the memory 1004 is a non-volatile memory unit or units.

The storage device 1006 is capable of providing mass storage for the computing device 1000. In some implementations, the storage device 1006 is a computer-readable medium. In various different implementations, the storage device 1006 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of duties is exemplary only. In some implementations, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device, such as a switch or router, e.g., through a network adapter.

The computing device 1000 may be implemented in a number of different forms, as shown in FIG. 9. For example, it may be implemented as a standard server 1020, or multiple times in a group of such servers. It may also be implemented as part of a rack server system 1024. In addition, it may be implemented in a personal computer, such as a laptop computer 1022. Alternatively, components from computing device 1000 may be combined with other components in a mobile device (not shown), such as device 1050. Each of such devices may contain one or more of computing device 1000, and an entire system may be made up of multiple computing devices 1000 communicating with each other.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

Example Application Name Parser:

---

1. Read application name lookup table // application name lookup table identifies a list of known applications, an application identifier of the application, each known application's associated words or phrases, and a confidence value associated with each application/word or phrase pair.
2. Receive Analyzed Tokens
3. For each Combination Of Tokens {    //Single Tokens and combinations of two or more tokens
4. Lookup combination of tokens in lookup table for any possible for matches to known application
5. If matches found
6.     then: generate a parsed token using the combination of tokens as the string
7.         Add a new property defining the application ID and the confidence value associated with the application/word or phrase pair
8.     else: if number of analyzed tokens in the combination of tokens == 1 // no synonyms and single token
9.         then: generate a parsed token using the combination of tokens as the string
10.        else: discard combination of tokens
11. Combine parsed tokens into a parsed query
12. Output parsed query

---

What is claimed is:

1. A server comprising:
a network communication device;
memory hardware; and
data processing hardware in communication with the network communication device and the memory hardware, the data processing hardware configured to execute computer-readable instructions that, in response to being executed by the data processing hardware, cause the data processing hardware to:
receive sensor data and application data from a client computing device via the network communication device, the sensor data comprising sensor measurement values from a plurality of sensors of the client computing device, the application data indicating application states of a plurality of applications installed on the client computing device;
identify an event trigger that indicates an occurrence of an event described by an event description, a first application of the client computing device to be notified of the occurrence of the event, and the event trigger comprising at least one of:
an application state trigger that indicates an application state of a second application from the plurality of applications; and
a sensor measurement trigger that indicates a sensor measurement value for a sensor from the plurality of sensors in the client computing device;
detect the occurrence of the event by at least one of:
comparing the application state trigger with application states in the application data; and
comparing the sensor measurement trigger with sensor measurement values in the sensor data;
transmit an event notification to the first application via the network communication device in response to detecting the occurrence of the event, the event notification indicating that the event has occurred; and
prior to transmitting the event notification:
determine that the first application does not have permission to receive the event notification; and
transmit a permission request to the client computing device, wherein the permission request comprises the event description, and the permission request indicates the sensors and the applications that are used to detect the event associated with the event notification.

2. The server of claim 1, wherein the computer-readable instructions cause the data processing hardware to:
receive, from a developer of the first application via a developer portal, a request to provide event notifications to the first application; and
detect the occurrence of the event in response to the receipt of the request.

3. The server of claim 1, wherein the computer-readable instructions cause the data processing hardware to identify the event trigger by inputting the event description into a machine learner, and the machine learner determines an event condition based on a model built using training data.

4. The server of claim 1, wherein the computer-readable instructions cause the data processing hardware to identify the application state trigger by identifying an application name of the second application in the event description.

5. The server of claim 1, wherein the computer-readable instructions cause the data processing hardware to identify the application state trigger by comparing the event description with the application states of the plurality of applications.

6. The server of claim 1, wherein the computer-readable instructions cause the data processing hardware to identify the sensor measurement trigger by comparing the event description with sensor names of the plurality of sensors.

7. The server of claim 1, wherein the computer-readable instructions cause the data processing hardware to, prior to transmitting the event notification, determine that the first application has permission to receive the event notification.

8. The server of claim 1, wherein the computer-readable instructions cause the data processing hardware to:
receive an indication from the client computing device that the permission request has been granted; and
transmit the event notification to the first application in response to the permission request being granted.

9. The server of claim 1, wherein the computer-readable instructions cause the data processing hardware to request the client computing device to periodically send the sensor data and the application data.

10. A computing device comprising:
a touchscreen display;
a plurality of sensors;
a transceiver;
memory hardware storing a plurality of applications; and
data processing hardware in communication with the touchscreen display, the plurality of sensors, the transceiver, and the memory hardware, the data processing hardware configured to execute computer-readable instructions that, in response to being executed by the data processing hardware, cause the data processing hardware to:
receive a selection to install another application;
identify sensors from the plurality of sensors that are used to detect the occurrence of an event that the selected application is to be notified of;
for each sensor that is used to detect the occurrence of the event:
request permission to use sensor measurement values of the sensor in detecting the occurrence of the event; and
transmit, to a server, the sensor measurement values to detect the occurrence of the event in response to the request being granted;

identify applications from the plurality of applications that are used to detect the occurrence of the event that the selected application is to be notified of;

for each application that is used to detect the occurrence of the event:
- request permission to use application states of the application in detecting the occurrence of the event; and
- transmit, to the server, the application states to detect the occurrence of the event in response to the request being granted; and in response to transmission of at least one of the application states and the sensor measurement values, receive, from the server, an event notification for the selected application, wherein the event notification indicates the occurrence of the event.

11. The computing device of claim 10, wherein the computer-readable instructions cause the data processing hardware to request permission to use the sensor measurement values of the sensor by:
- displaying a selectable graphical user interface (GUI) element; and
- receiving a selection of the GUI element.

12. The computing device of claim 11, wherein the GUI element comprises a toggle switch.

13. The computing device of claim 10, wherein the computer-readable instructions cause the data processing hardware to request requests permission to use the application states of the application by:
- displaying a selectable graphical user interface (GUI) element; and
- receiving a selection of the GUI element.

14. The computing device of claim 13, wherein the GUI element comprises a button.

15. The computing device of claim 10, wherein the computer-readable instructions cause the data processing hardware to identify the sensors that are used to detect the occurrence of the event by:
- transmitting an application identifier (ID) of the selected application being installed to a server the server; and
- receiving sensor identifiers (IDs) of the sensors that are used to detect the occurrence of the event from the server.

16. The computing device of claim 10, wherein the computer-readable instructions cause the data processing hardware to identify the applications that are used to detect the occurrence of the event by:
- transmitting an application identifier of the selected application to the server; and
- receiving application identifiers (IDs) of the applications that are used to detect the occurrence of the event from the server.

17. A computer-implemented method comprising:
- receiving, at data processing hardware of a computing device, a selection to install an application on the computing device;
- transmitting, via a transceiver in the data processing hardware, an application identifier (ID) of the selected application to a server;
- receiving, by the data processing hardware from the server, sensor identifiers that identify sensors of the computing device that are used to detect the occurrence of an event that the selected application is to be notified of;
- for each sensor that is used to detect the occurrence of the event:
  - by the data processing hardware, requesting permission, via a touchscreen display of the computing device, to use sensor measurement values of the sensor in detecting the occurrence of the event; and
  - by the data processing hardware, based on the request being granted, transmitting to the server, via the transceiver, to use the sensor measurement values to detect the occurrence of the event;
- receiving, by the data processing hardware from the server, application identifiers that identify applications installed on the computing device that are used to detect the occurrence of the event that the selected application is to be notified of;
- for each application that is used to detect the occurrence of the event:
  - by the data processing hardware, requesting permission, via the touchscreen display, to use application states of the application in detecting the occurrence of the event; and
  - by the data processing hardware, based on the request being granted, transmitting to the server, via the transceiver, the application states to detect the occurrence of the event; and
- in response to transmission of at least one of the application states and the sensor measurement values, receiving by the data processing hardware from the server, an event notification for the selected application, wherein the event notification indicates the occurrence of the event.

18. The computer-implemented method of claim 17, wherein requesting permission to use the application states comprises:
- displaying a toggle switch on the touchscreen display, the toggle switch comprising a first position that indicates a grant of permission to use the application states and a second position that indicates a denial of permission to use the application states; and
- receiving a selection to switch the toggle switch to the first position that indicates the grant of permission.

19. The computer-implemented method of claim 17, further comprising:
- receiving, at the computing device, a request, from the server, for periodic sensor measurement values of the sensors in the computing device and application states of the applications installed on the computing device;
- requesting permission, via the touchscreen display, to periodically transmit the sensor measurement values and the application states to the server;
- periodically transmitting the sensor measurement values of the sensors for which permission is granted; and
- periodically transmitting the application states of the applications for which permission is granted.

* * * * *